(12) United States Patent
Iida

(10) Patent No.: US 11,465,643 B2
(45) Date of Patent: Oct. 11, 2022

(54) OBSTACLE RECOGNITION DEVICE AND OBSTACLE RECOGNITION METHOD

(71) Applicant: Mitsubishi Electric Corporation, Tokyo (JP)

(72) Inventor: Koji Iida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 170 days.

(21) Appl. No.: 16/753,631

(22) PCT Filed: Nov. 20, 2017

(86) PCT No.: PCT/JP2017/041720
§ 371 (c)(1),
(2) Date: Apr. 3, 2020

(87) PCT Pub. No.: WO2019/097731
PCT Pub. Date: May 23, 2019

(65) Prior Publication Data
US 2020/0276983 A1 Sep. 3, 2020

(51) Int. Cl.
*B60W 60/00* (2020.01)
*G06V 20/58* (2022.01)

(52) U.S. Cl.
CPC ......... *B60W 60/0011* (2020.02); *G06V 20/58* (2022.01); *B60W 2554/4041* (2020.02); *B60W 2554/4043* (2020.02)

(58) Field of Classification Search
None
See application file for complete search history.

(56) References Cited

U.S. PATENT DOCUMENTS

| 2004/0098224 | A1 | 5/2004 | Takahashi |
| 2014/0032012 | A1 | 1/2014 | Joshi et al. |
| 2016/0377702 | A1 | 12/2016 | Yomo et al. |

FOREIGN PATENT DOCUMENTS

| JP | 2004-037239 A | 2/2004 |
| JP | 2010-249613 A | 11/2010 |
| JP | 2014-025925 A | 2/2014 |
| JP | 2017-009574 A | 1/2017 |

OTHER PUBLICATIONS

International Search Report for PCT/JP2017/041720 dated Feb. 13, 2018 [PCT/ISA/210].
Written Opinion for PCT/JP2017/041720 dated Feb. 13, 2018 [PCT/ISA/237].

*Primary Examiner* — Tamara L Weber
(74) *Attorney, Agent, or Firm* — Sughrue Mion, PLLC; Richard C. Turner

(57) ABSTRACT

An obstacle recognition device includes: a first sensor and a second sensor, which are configured to detect an object near a vehicle; a calculation unit configured to calculate, based on first detection data on a first object detected by the first sensor and second detection data on a second object detected by the second sensor, an index value for identifying whether the two objects are the same object; a determination unit configured to determine whether the two objects are the same object by comparing the index value with a threshold value set in advance; and a correction unit configured to calculate, when the determination unit has determined that the two objects are the same object, a detection error between the two sensors based on the two detection data, and generate corrected detection data so as to remove the detection error.

15 Claims, 17 Drawing Sheets

OBSTACLE RECOGNITION DEVICE AND OBSTACLE RECOGNITION METHOD

CROSS REFERENCE TO RELATED APPLICATIONS

This application is a National Stage of International Application No. PCT/JP2017/041720 filed Nov. 20, 2017.

TECHNICAL FIELD

The present invention relates to an obstacle recognition device and an obstacle recognition method, for recognizing an obstacle by using an in-vehicle sensor.

BACKGROUND ART

Hitherto, there has been proposed an obstacle recognition device configured to recognize an obstacle near a vehicle by using a plurality of pieces of sensor information in combination (e.g., refer to Patent Literature 1).

The obstacle recognition device of Patent Literature 1 includes a front camera and a millimeter-wave radar as sensors. The front camera acquires first parameter information on an obstacle, and the millimeter-wave radar acquires second parameter information on the obstacle. The obstacle recognition device of Patent Literature 1 calculates an amount of axial deviation of an azimuth angle of the front camera or the millimeter-wave radar based on the first parameter information and the second parameter information, and uses the calculated amount of axial deviation to correct the axial deviation of the azimuth angle of the front camera or the millimeter-wave radar.

CITATION LIST

Patent Literature

[PTL 1] JP 2010-249613 A

SUMMARY OF INVENTION

Technical Problem

However, the related art has the following problem.

The sensors mounted on a vehicle are, for example, a camera, a millimeter-wave radar, a laser radar, an ultrasonic sensor, and an infrared sensor. When a plurality of sensors detect the same object, a detection error (hereinafter referred to as "bias error") occurs among the plurality of sensors depending on the types of those sensors. The bias error sometimes changes temporarily due to a travel environment of the vehicle, and thus it is difficult to estimate the bias error.

The related-art obstacle recognition device does not assume this bias error. As a result, the related-art obstacle recognition device has a problem in that, even when the plurality of sensors have actually detected the same object, the plurality of sensors erroneously recognize the same object as separate objects due to the bias error among those sensors.

The present invention has been made to solve the above-mentioned problem, and has an object to provide an obstacle recognition device and an obstacle recognition method, which are capable of accurately identifying, when a plurality of sensors have actually detected the same object, the same object without erroneously recognizing the same object as separate objects.

Solution to Problem

According to one embodiment of the present invention, there is provided an obstacle recognition device including: a first sensor and a second sensor, which are configured to detect an object near a vehicle; a calculation unit configured to calculate, based on first detection data on a first object detected by the first sensor and second detection data on a second object detected by the second sensor, an index value for identifying whether the first object and the second object are the same object; a determination unit configured to determine whether the first object and the second object are the same object by comparing the index value with a threshold value set in advance; and a correction unit configured to calculate, when the determination unit has determined that the first object and the second object are the same object, a detection error between the first sensor and the second sensor based on the first detection data and the second detection data, and generate corrected detection data so as to remove the detection error.

Further, according to one embodiment of the present invention, there is provided an obstacle recognition device including: a first sensor configured to detect an object near a vehicle; a prediction unit configured to predict movement of the object based on detection data detected by the first sensor before, to generate a prediction value at a current time as third detection data on a third object; a calculation unit configured to calculate, based on first detection data on a first object detected by the first sensor and the third detection data on the third object detected by the prediction unit, an index value for identifying whether the first object and the third object are the same object; and a determination unit configured to determine whether the first object and the third object are the same object by comparing the index value with a threshold value set in advance; and a correction unit configured to calculate, when the determination unit has determined that the first object and the third object are the same object, a bias error between a result of detection by the first sensor and a result of generation by the prediction unit based on the first detection data and the third detection data, and generate corrected detection data so as to remove the bias error.

Further, according to one embodiment of the present invention, there is provided an obstacle recognition method to be executed by a controller configured to implement functions of the calculation unit, the determination unit, and the correction unit, the obstacle recognition method including the steps of: calculating the index value for identifying whether the first object and the second object are the same object based on the first detection data on the first object detected by the first sensor and the second detection data on the second object detected by the second sensor; determining whether the first object and the second object are the same object by comparing the index value with a threshold value set in advance; and calculating, when it is determined in the determining step that the first object and the second object are the same object, the detection error between the first sensor and the second sensor based on the first detection data and the second detection data, and generating corrected detection data so as to remove the detection error.

Further, according to one embodiment of the present invention, there is provided an obstacle recognition method to be executed by a controller configured to implement functions of the prediction unit, the calculation unit, the determination unit, and the correction unit, the obstacle recognition method including the steps of: predicting movement of the object based on detection data detected by the first sensor before, and generating a prediction value at a current time as the third detection data on the third object; calculating, based on the first detection data on the first object detected by the first sensor and the third detection data on the third object generated in the predicting step, the index value for identifying whether the first object and the third object are the same object; determining whether the first object and the third object are the same object by comparing the index value with a threshold value set in advance; and calculating, when it is determined in the determining step that the first object and the third object are the same object, the bias error between a result of detection by the first sensor and a result of generation in the predicting step based on the first detection data and the third detection data, and generating corrected detection data so as to remove the detection error.

Advantageous Effects of Invention

The obstacle recognition device according to the present invention is configured to correct the bias error among a plurality of sensors when pieces of information from the plurality of sensors are used in combination to recognize an obstacle. As a result, it is possible to obtain the obstacle recognition device and the obstacle recognition method, which are capable of accurately identifying, when the plurality of sensors have actually detected the same object, the same object without erroneously recognizing the same object as separate objects.

DESCRIPTION OF EMBODIMENTS

An obstacle recognition device and an obstacle recognition method according to preferred embodiments of the present invention are described below with reference to the accompanying drawings.

First Embodiment

Figure 1:
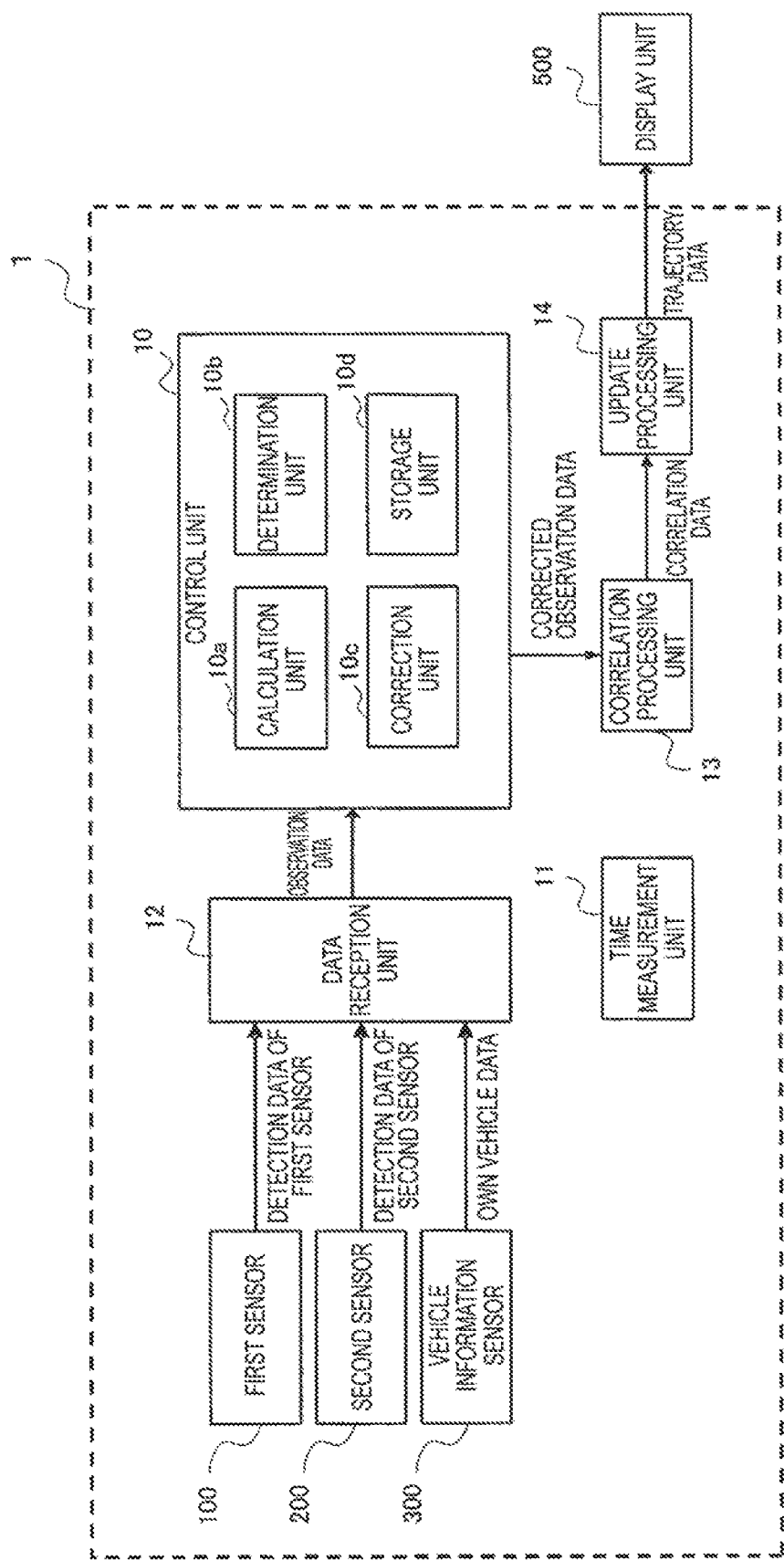
FIG. 1 is a block diagram for illustrating a configuration of an obstacle recognition device according to each of first, second, and third embodiments of the present invention.

FIG. 1 is a block diagram for illustrating a configuration of an obstacle recognition device 1 according to a first embodiment of the present invention.

The obstacle recognition device 1 according to the first embodiment includes a control unit 10, a time measurement unit 11, a data reception unit 12, a correlation processing unit 13, an update processing unit 14, a first sensor 100, a second sensor 200, and a vehicle information sensor 300. In the following description, those components are sometimes referred to as respective "blocks" of the obstacle recognition device 1.

The first sensor 100 and the second sensor 200 are sensors configured to receive light and electromagnetic waves emitted or reflected by an object, and apply signal processing and image processing to the light and electromagnetic waves to measure, for example, a distance to the object, an azimuth angle, and a relative speed. Specifically, a millimeter-wave radar, a laser radar, an ultrasonic sensor, an infrared sensor, an optical camera, and the like can be used alone or in combination as the first sensor 100 and the second sensor 200.

In the following description, information on an object measured by the first sensor 100 and the second sensor 200 is referred to as "detection data".

The vehicle information sensor 300 is a sensor configured to measure a state of an own vehicle. Specifically, the vehicle information sensor 300 measures, for example, a speed, a wheel speed, a steering angle, or a yaw rate of the own vehicle. Information indicating the state of the own vehicle measured by the vehicle information sensor 300 is hereinafter referred to as "own vehicle data".

The control unit 10 is an electronic control unit (ECU) configured to control functions of the obstacle recognition device 1 in an integrated manner. Further, the control unit 10 includes a calculation unit 10a, a determination unit 10b, a correction unit 10c, and a storage unit 10d.

The time measurement unit 11 has a function of measuring time, and outputting the measured time to each block included in the obstacle recognition device 1.

The data reception unit 12 is configured to receive the detection data and the own vehicle data transmitted from the first sensor 100, the second sensor 200, and the vehicle information sensor 300. The data reception unit 12 outputs the received detection data to the control unit 10 in association with the time measured by the time measurement unit 11.

In the following, for the sake of simplicity of description, data obtained by adding time information to detection data in this manner is referred to as "observation data".

The calculation unit 10a, the determination unit 10b, and the correction unit 10c of the control unit 10 are configured to execute preset processing in bias error correction processing described later.

The calculation unit 10a is configured to execute processing of calculating, for example, a calculated value and an index value in the bias error correction processing.

The determination unit 10b is configured to compare the index value calculated by the calculation unit 10a with a threshold value condition set in advance, to thereby determine whether a selected pair of objects is the same object.

The correction unit 10c is configured to correct observation data being detection data containing time information by using the calculated bias error value.

The storage unit 10d is constructed by, for example, a volatile memory or a non-volatile memory. The storage unit 10d stores, for example, observation data, a calculated value, an index value, own vehicle data, and trajectory data. Further, the storage unit 10d creates and stores an observation data history, which stores observation data in a chronological order. Further, the storage unit 10d stores program data for controlling the functions of the obstacle recognition device 1.

The correlation processing unit 13 is configured to execute correlation processing of associating objects detected by the first sensor 100 and the second sensor 200 with each other based on the corrected observation data transmitted from the control unit 10, to thereby generate correlation data. The correlation processing unit 13 outputs the corrected observation data and the correlation data to the update processing unit 14.

The update processing unit 14 is configured to update object information of the corrected observation data based on the correlation data. The "object information" herein refers to information such as the position, speed, acceleration, or type of an object detected by the first sensor 100 or the second sensor 200. The object information can be updated by using, for example, a Kalman filter or a particle filter.

The updated object information is output from the update processing unit 14 to a display unit 500 as "trajectory data". Further, the storage unit 10d stores the trajectory data in association with the time measured by the time measurement unit 11 at a timing at which the update processing unit 14 updates the object information.

The display unit 500 installed outside of the obstacle recognition device 1 processes and displays the trajectory data output from the update processing unit 14 as an image, character information, or other information. The display unit 500 may be installed inside of the obstacle recognition device 1.

Each block included in the obstacle recognition device 1 and each block included in the control unit 10 may be constructed so as to be mounted on independent ECUs, or a part or all of the blocks may be constructed so as to be mounted on one ECU.

Figure 2:
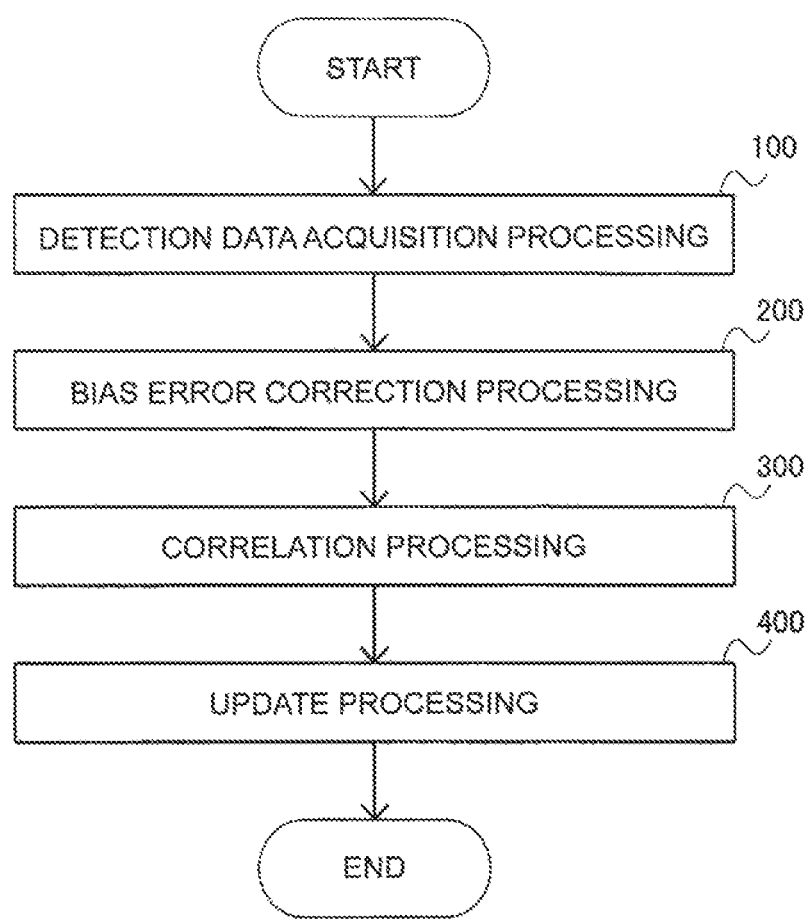
FIG. 2 is a flow chart for illustrating processing to be executed by the obstacle recognition device according to each of the first, second, and third embodiments of the present invention.

Next, with reference to a flow chart of FIG. 2, a description is given of a flow of processing to be executed by the obstacle recognition device 1 according to the first embodiment.

First, the data reception unit 12 executes detection data acquisition processing based on a command from the control unit 10 (Step S100). In the detection data acquisition processing, the data reception unit 12 acquires detection data from the first sensor 100 and the second sensor 200, and acquires own vehicle data from the vehicle information sensor 300. Next, the data reception unit 12 generates observation data obtained by associating the acquired detection data with the time measured by the time measurement unit 11. The observation data is output from the data reception unit 12 to the control unit 10.

Next, the control unit 10 executes the bias error correction processing (Step S200). In the bias error correction processing, first, the calculation unit 10a of the control unit 10 calculates a value of difference in physical quantities of a pair of objects detected by the first sensor 100 and the second sensor 200, based on the observation data output from the data reception unit 12. The "physical quantity" herein refers to information such as the position, speed, acceleration, or type of an obstacle, and is sometimes referred to as "object information" in the following description.

Next, the determination unit 10b of the control unit 10 determines based on a preset condition whether the selected pair of objects is the same object. When it is determined that the selected pair of objects is the same object, the control unit 10 sets or calculates a bias error of the selected pair of objects.

Next, the correction unit 10c of the control unit 10 uses the bias error value to correct observation data being detection data containing time information, and finishes the bias error correction processing. The corrected observation data is output from the control unit 10 to the correlation processing unit 13.

Next, the correlation processing unit 13 executes correlation processing (Step S300). In the correlation processing, the correlation processing unit 13 uses the corrected observation data to associate objects detected by the first sensor 100 and the second sensor 200 with each other, to thereby generate correlation data. The correlation processing unit 13 outputs the corrected observation data and the correlation data to the update processing unit 14.

Next, the update processing unit 14 executes processing of updating the object information (Step S400). The update processing unit 14 updates pieces of object information of the corrected observation data of the first sensor and the second sensor, which are associated with each other by the correlation data, by using a Kalman filter, for example.

After that, the obstacle recognition device 1 finishes the processing. The processing illustrated in FIG. 2 is repeatedly executed at a preset operation period.

Next, details of the bias error correction processing to be executed by the obstacle recognition device 1 according to the first embodiment are described with reference to FIG. 3 and FIG. 4.

Figure 3:
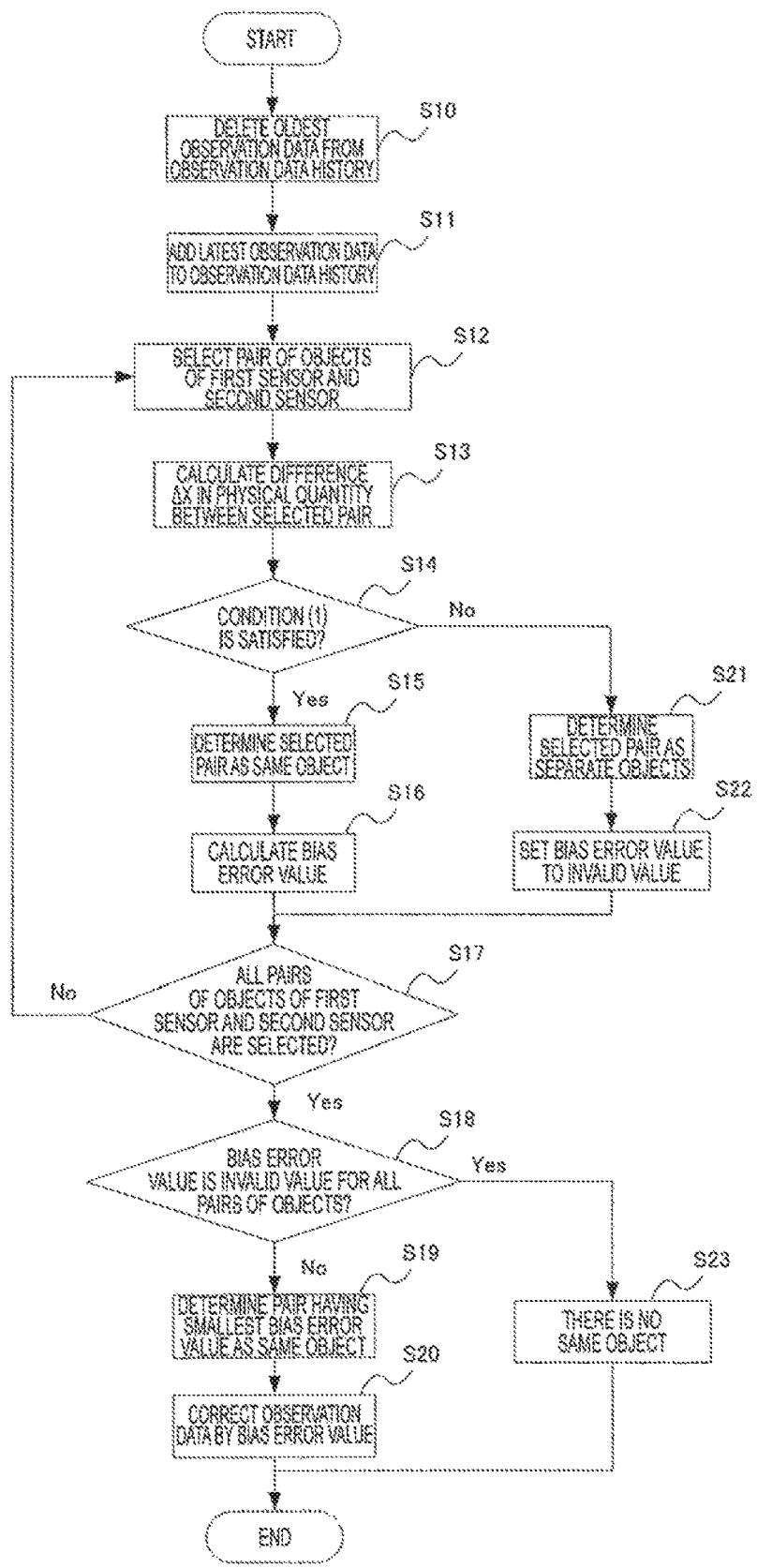
FIG. 3 is a flow chart for illustrating error correction processing in the first embodiment of the present invention.

FIG. 3 is a flow chart for illustrating the bias error correction processing to be executed by the obstacle recognition device 1 according to the first embodiment of the present invention.

In Step S10 of FIG. 3, the control unit 10 of the obstacle recognition device 1 deletes the oldest observation data from an observation data history stored in the storage unit 10d.

Next, in Step S11, the control unit 10 stores the latest observation data acquired at the current period into the observation data history of the storage unit 10d. The observation data is detection data containing time information. Further, the detection data is numerical data such as the position, speed, or acceleration, which is a physical quantity of the detected object. The observation data is stored into the storage unit 10d in association with a number and symbol (hereinafter referred to as "sensor ID") for identifying the detected sensor, and a number and symbol (hereinafter referred to as "object ID") for identifying the detected object.

Next, in Step S12, the control unit 10 selects one object for each of the first sensor 100 and the second sensor 200 from among a plurality of objects acquired by each of the first sensor 100 and the second sensor 200, based on the observation data stored in the storage unit 10d. The selected pair of objects is hereinafter referred to as "selected pair of objects".

Next, in Step S13, the calculation unit 10a of the control unit 10 calculates a value of an error between observation data of the first sensor 100 and observation data of the second sensor 200. Specifically, a value of a difference in physical quantity of observation data between the selected pair of objects is calculated as an error value $\Delta X$. A method of calculating $\Delta X$ is described with reference to FIG. 4.

Figure 4:
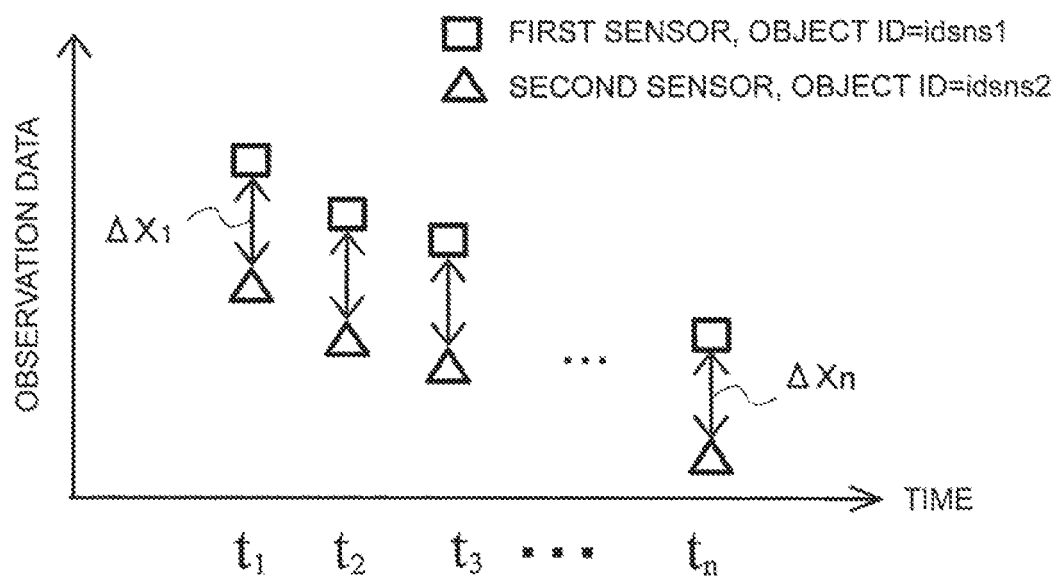
FIG. 4 is a graph for showing an error calculation method in the first embodiment of the present invention.

FIG. 4 is a graph for showing the method of calculating the error $\Delta X$ between pieces of observation data in the first embodiment of the present invention. The horizontal axis of FIG. 4 indicates time, and the vertical axis of FIG. 4 indicates the physical quantity of observation data. The physical quantity of observation data is numerical data such as the position, speed, or acceleration of objects detected by the first sensor 100 and the second sensor 200.

The object detected by the first sensor 100 is set to have an object ID=idsns1 in the selected pair of objects. The observation data at a time k of the object ID=idsns1 is set to be Xksns1. Similarly, the object detected by the second sensor 200 is set to have an object ID=idsns2 in the selected pair of objects. The observation data at a time k of the object ID=idsns2 is set to be Xksns2.

The calculation unit 10a of the control unit 10 calculates an absolute value of a difference between Xksns1 and Xksns2 as an inter-sensor error $\Delta Xk$ of the observation data at the time k.

In Step S13 of FIG. 3, as shown in FIG. 4, the calculation unit 10a calculates inter-sensor errors $\Delta X1$ to $\Delta Xn$ of observation data associated with the times t1 to tn.

Next, the control unit 10 advances the processing to Step 14. In Step S14, the determination unit 10b of the control unit 10 determines whether the selected pair of objects set in Step S12 is the same object based on a condition (1) set in advance. As a value of a difference in physical quantity between the selected pair of objects becomes smaller, the selected pair of objects is more highly likely to be the same object. Thus, the determination based on the condition (1) can be executed in the following manner, for example.

The condition (1) specifies that the range of deviations of the inter-sensor errors $\Delta X1$ to $\Delta Xn$ is smaller than a threshold value set in advance. A value obtained by subtracting the minimum value from the maximum value of $\Delta X1$ to $\Delta Xn$, an average value of $\Delta X1$ to $\Delta Xn$, a median of $\Delta X1$ to $\Delta Xn$, or other values can be used as the range of deviations.

In Step S14, when the range of deviations of the inter-sensor errors $\Delta X1$ to $\Delta Xn$ is smaller than a threshold value set in advance (Step S14: Yes), the determination unit 10b of the control unit 10 determines that the selected pair of objects is the same object (Step S15).

On the contrary, in Step S14, when the range of deviations of the inter-sensor errors $\Delta X1$ to $\Delta Xn$ is equal to or larger than the threshold value set in advance (Step S14: No), the determination unit 10b of the control unit 10 determines that the selected pair of objects is not the same object (Step S21).

After Step S15, the control unit 10 advances the processing to Step S16.

In Step S16, the control unit 10 sets or calculates a bias error value of the selected pair of objects. The latest $\Delta Xn$ can be set as the bias error value from among the inter-sensor errors $\Delta X1$ to $\Delta Xn$ of pieces of observation data corresponding to the times t1 to tn, for example. Alternatively, the average value, median, or other values of $\Delta X1$ to $\Delta Xn$ may be calculated and used as the bias error value.

Meanwhile, after Step S21, the control unit 10 advances the processing to Step S22.

In Step S22, the control unit 10 sets the bias error value of the selected pair of objects to an invalid value.

After Step S16 or Step S22, the control unit 10 advances the processing to Step S17.

In Step S17, when all the pairs of objects are already selected from among objects contained in observation data of the first sensor 100 and the second sensor 200 (Step S17: Yes), the control unit 10 advances the processing to Step S18.

On the contrary, when not all the pairs of objects are selected yet (Step S17: No), the control unit 10 returns to Step S12 to newly set a selected pair of objects.

In Step S18, the determination unit 10b of the control unit 10 determines whether the bias error value set in Step S16 is an invalid value for all the selected pairs of objects. When the bias error value is not set to an invalid value for all the selected pairs of objects (Step S18: No), the control unit 10 advances the processing to Step S19.

On the contrary, when the bias error value is set to an invalid value for at least one of the selected pairs of objects (Step S18: Yes), the control unit 10 advances the processing to Step S23.

In Step S18, the control unit 10 determines, as the same object, a selected pair of objects having the smallest bias error value among all the selected pairs of objects. Next, the control unit 10 advances the processing to Step S20.

Meanwhile, in Step S23, the control unit 10 determines that there is no same object among all the selected pairs of objects. That is, the control unit 10 determines that there is no same object in observation data of the first sensor 100 and the second sensor 200, and finishes the bias error correction processing.

In Step S20, the correction unit 10c of the control unit 10 uses the bias error value for the selected pair of objects determined to be the same object to execute processing of correcting the observation data. The correction processing may be, in order to remove a bias error, which is a detection error between sensors, to subtract the bias error value from observation data of the first sensor 100, for example. After the correction processing of Step S20 is finished, the control unit 10 finishes the bias error correction processing.

An additional description is given of the determination of Step S15 and the determination of Step S19 described above.

In the flow of the bias error correction processing, when there is only one detected object in observation data of the first sensor 100 and in observation data of the second sensor 200, there is only one combination of a selected pair of objects. Then, when the selected pair of objects is determined to be the same object in Step S15, the processing is uniquely advanced in order of Step S16, "Yes" in Step S17, and "No" in Step S18. Then, in Step S19, the selected pair of objects is determined to be the same object.

On the contrary, when there are a plurality of detected objects in observation data of the first sensor 100 and in observation data of the second sensor 200, there are also a plurality of combinations of selected pairs of objects. Thus, even when the selected pair of objects selected first is determined to be the same object in Step S15, there may be another selected pair of objects having a smaller bias error. Thus, the control unit 10 repeatedly executes the processing of from Step S12 to Step S17 until calculation of the bias error value is finished for all the selected pairs of objects. Then, in Step S19, the control unit 10 determines, as the same object, a selected pair of objects having the smallest bias error value.

As described above, according to the obstacle recognition device of the first embodiment, it is possible to accurately recognize an object by determining whether the selected pair of objects is the same object with the use of a calculated value of a difference in physical quantity as a determination index value.

Second Embodiment

Figure 5:
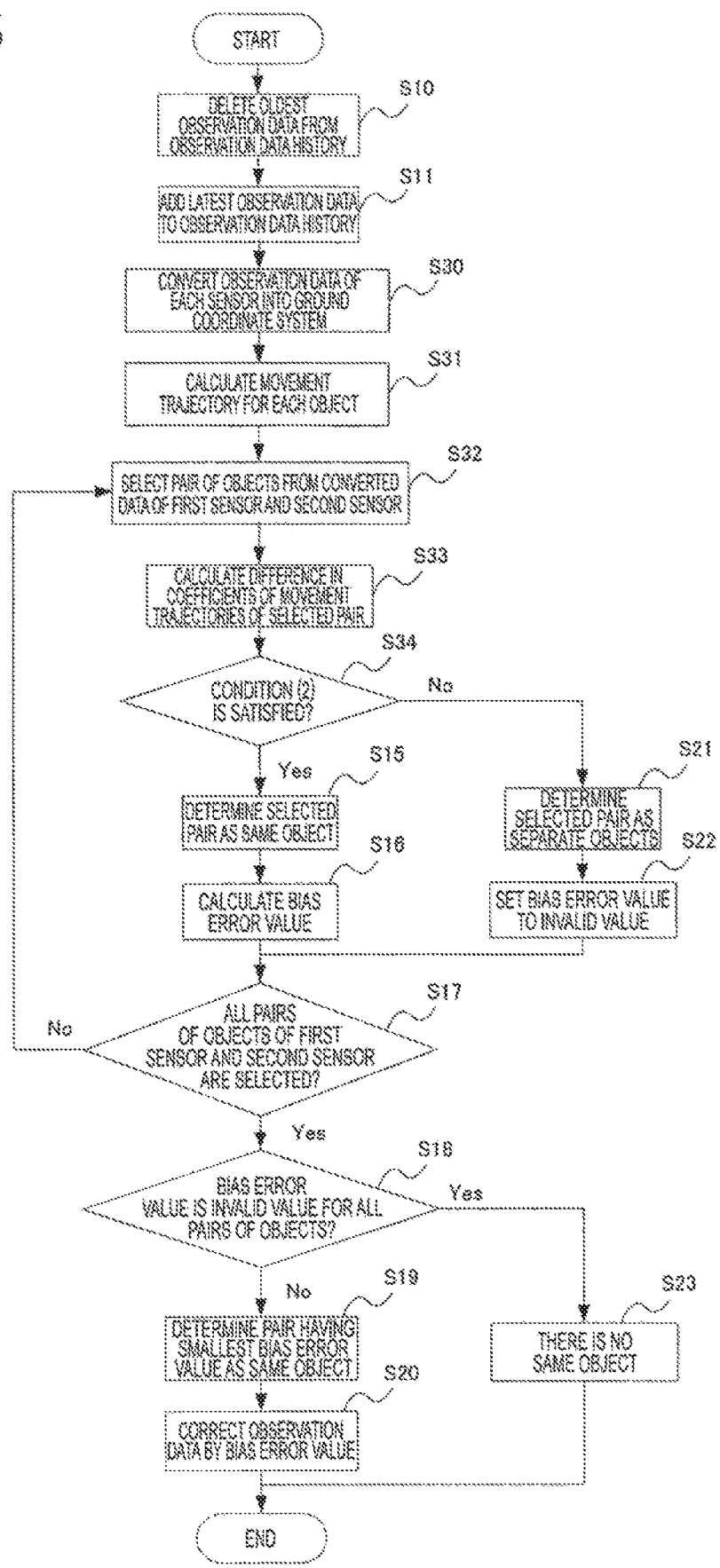
FIG. 5 is a flow chart for illustrating error correction processing in the second embodiment of the present invention.
Figure 6:
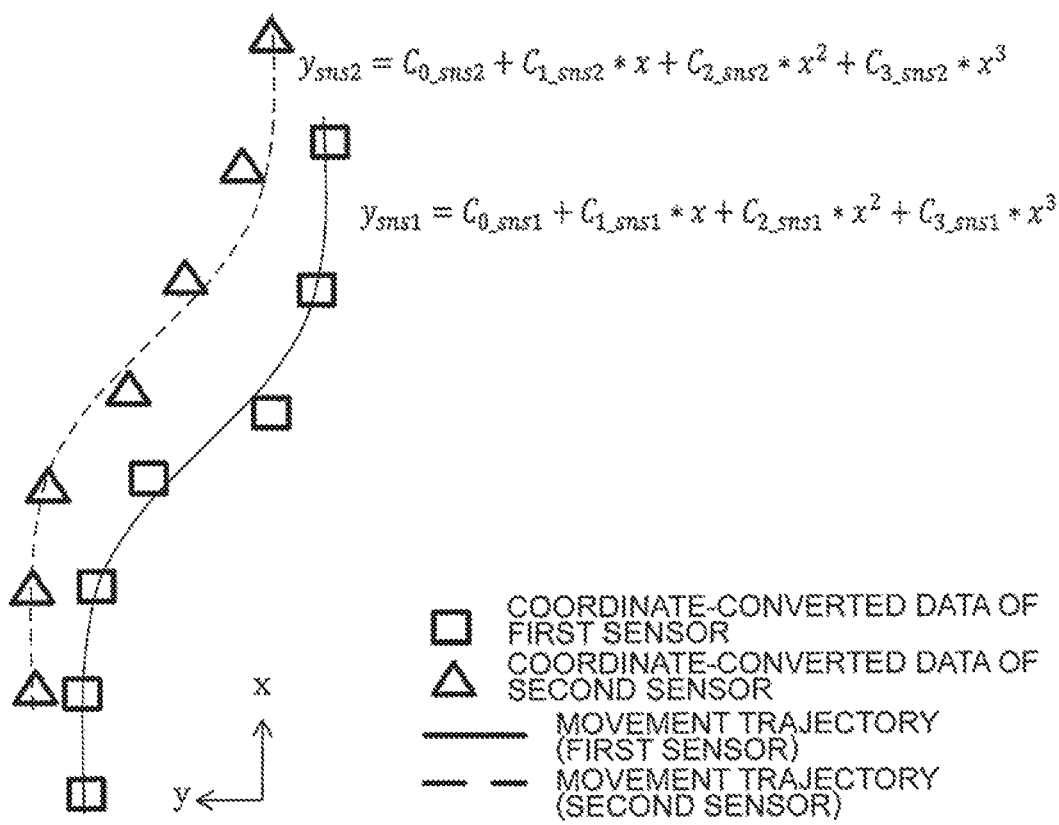
FIG. 6 is an explanatory diagram of the error correction processing in the second embodiment of the present invention.

Next, with reference to FIG. 5 and FIG. 6, a description is given of a flow of control processing to be executed by the obstacle recognition device 1 according to a second embodiment of the present invention.

The second embodiment and the first embodiment are different from each other in the configuration of an index value for determining whether the selected pair of objects is the same object. The configuration of the obstacle recognition device 1 according to the second embodiment is similar to that of the block diagram illustrated in FIG. 1 of the first embodiment, and thus a description thereof is omitted here.

The bias error correction processing in the first embodiment calculates a value of a difference in physical quantity between the selected pair of objects based on observation data of the first sensor 100 and the second sensor 200. Further, a description has been given of an example of determining whether the selected pair of objects is the same object by using the calculated value of a difference in physical quantity. In contrast, in the second embodiment, movement trajectories of the selected pair of objects are approximated by polynomials, and values of a difference in coefficients of the approximated polynomials are calculated to determine whether the selected pair of objects is the same object.

FIG. 5 is a flow chart for illustrating a flow of processing to be executed by the obstacle recognition device 1 according to the second embodiment of the present invention. The same components as those of the first embodiment are denoted by the same reference symbols, and a description thereof is omitted here.

The processing of deleting the oldest observation data in Step S10 of FIG. 5 and the processing of adding the latest observation data in Step S11 of FIG. 5 are similar to those of FIG. 3 described in the first embodiment, and thus a description thereof is omitted here.

Next, in Step S30, the control unit 10 uses the own vehicle data to execute conversion of the observation data of the first sensor 100 and the second sensor 200 into a ground coordinate system. The observation data converted into the ground coordinate system in this manner is hereinafter referred to as "coordinate-converted data". The coordinate-converted data is stored in the storage unit 10d.

Next, in Step S31, the calculation unit 10a of the control unit 10 uses the coordinate-converted data to calculate movement trajectories of objects detected by the first sensor 100 and the second sensor 200.

FIG. 6 is a diagram for illustrating a method of calculating the movement trajectories of detected objects in the second embodiment of the present invention. In FIG. 6, coordinate-converted data on an object detected by the first sensor 100 and an object detected by the second sensor 200 at each time is illustrated. In FIG. 6, pieces of coordinate-converted data at seven times at which an object is detected are plotted on the ground coordinate system xy.

The movement trajectory of an object can be approximated by a polynomial of $y=C0+C1*X+C2*X^2+C3*X^3$. As illustrated in FIG. 6, the movement trajectory of an object detected by the first sensor 100 is a polynomial of $ysns1=C0sns1+C1sns1*X+C2sns1*X^2+C3sns1*X^3$. Similarly, the movement trajectory of an object detected by the second sensor 200 is a polynomial of $ysns2=C0sns2+C1sns2*X+C2sns2*X^2+C3sns2*X^3$.

The calculation unit 10a uses the coordinate-converted data to calculate coefficients of C0, C1, C2, and C3 of the polynomial of $y=C0+C1*X+C2*X^2+C3*X^3$ approximating the movement trajectory, to thereby calculate the movement trajectory.

Specifically, the calculation unit 10a calculates coefficients of C0sns1, C1sns1, C2sns1, and C3sns1 of the polynomial of $ysns1=C0sns1+C1sns1*X+C2sns1*X^2+C3sns1*X^3$ of the object detected by the first sensor 100. Similarly, the calculation unit 10a calculates coefficients of C0sns2, C1sns2, C2sns2, and C3sns2 of the polynomial of $ysns2=C0sns2+C1sns2*X+C2sns2*X^2+C3sns2*X^3$ of the object detected by the second sensor 200.

Next, in Step S32, the control unit 10 selects one object for each of the first sensor 100 and the second sensor 200 from among a plurality of objects contained in the coordinate-converted data of the first sensor 100 and the second sensor 200 stored in the storage unit 10d, to thereby set a selected pair of objects.

Next, in Step S33, the calculation unit 10a of the control unit 10 calculates absolute values of a difference in coefficients of the above-mentioned polynomial, in order to compare movement trajectories of the selected pair of objects with each other.

The absolute values of a difference in coefficients C0, C1, C2, and C3 are represented by ΔC0, ΔC1, ΔC2, and ΔC3, respectively. In the case of two movement trajectories illustrated in FIG. 6, the calculation unit 10a calculates ΔC0=abs(C0sns1−C0sns2), ΔC1=abs(C1sns1−C1sns2), ΔC2=abs(C2sns1−C2sns2), ΔC3=abs(C3sns1−C3sns2).

Next, in Step S34, the determination unit 10b of the control unit 10 determines whether the selected pair of objects is the same object based on a condition (2) set in advance. As a degree of similarity between the movement trajectories of the selected pair of objects becomes higher, the selected pair of objects is more highly likely to be the same object. Thus, the determination based on the condition (2) can be executed in the following manner, for example.

First, the control unit 10 sets in advance respective threshold values corresponding to the absolute values ΔC0, ΔC1, ΔC2, and ΔC3 of the values of a difference in coefficients. Then, in Step S34, when all of ΔC0, ΔC1, ΔC2, and ΔC3 are smaller than the respective threshold values set in advance (Step S34: Yes), the determination unit 10b of the control unit 10 determines that the selected pair of objects is the same object (Step S15).

On the contrary, in Step S34, when any one of ΔC0, ΔC1, ΔC2, and ΔC3 is equal to or larger than the corresponding threshold value set in advance (Step S34: No), the determination unit 10b of the control unit 10 determines that the selected pair of objects is not the same object (advances the processing to Step S21).

The processing of Step S15 and Step S21 following Step S34 and the subsequent steps are similar to that of FIG. 3 described in the first embodiment, and thus a description thereof is omitted here.

As described above, according to the obstacle recognition device of the second embodiment, it is possible to accurately recognize an object by determining whether the selected pair of objects is the same object with the use of a degree of similarity between the movement trajectories of the selected pair of objects in the ground coordinate system as a determination index value.

Third Embodiment

Next, with reference to FIG. 7 and FIG. 8A to FIG. 8C, a description is given of a flow of control processing to be executed by the obstacle recognition device 1 according to a third embodiment of the present invention.

The third embodiment, and the first and second embodiments are different from each other in the configuration of the calculated value for determining whether the selected pair of objects is the same object. The configuration of the obstacle recognition device 1 according to the third embodiment is similar to that of the block diagram illustrated in FIG. 1 of the first embodiment, and thus a description thereof is omitted here.

In the bias error correction processing in the first embodiment, a description has been given of an example of calculating the value of a difference in physical quantity between the selected pair of objects and determining whether the selected pair of objects is the same object. Further, in the second embodiment, a description has been given of an example of approximating the movement trajectories of the selected pair of objects by respective polynomials, calculating values of a difference in coefficients of the approximated polynomials, and determining whether the selected pair of objects is the same object.

In contrast, in the third embodiment, a correlation coefficient is calculated based on time-series data on ground coordinate positions of a selected pair of objects, and it is determined whether the selected pair of objects is the same object based on the calculated correlation coefficient.

Next, with reference to FIG. 7 and FIG. 8A to FIG. 8C, a description is given in detail of the bias error correction processing to be executed by the obstacle recognition device 1 according to the third embodiment.

Figure 7:
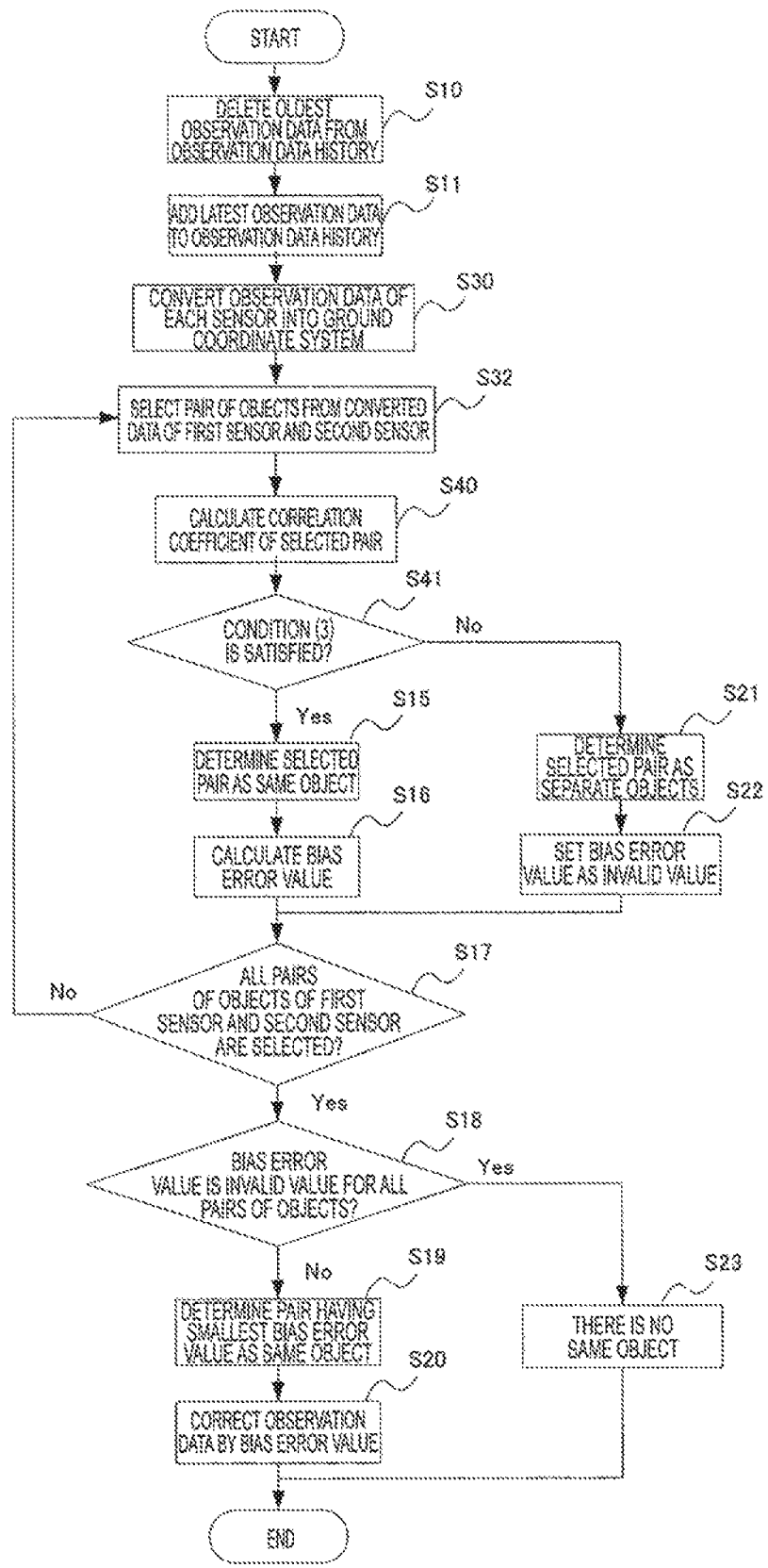
FIG. 7 is a flow chart for illustrating error correction processing in the third embodiment of the present invention.
Figure 8A:
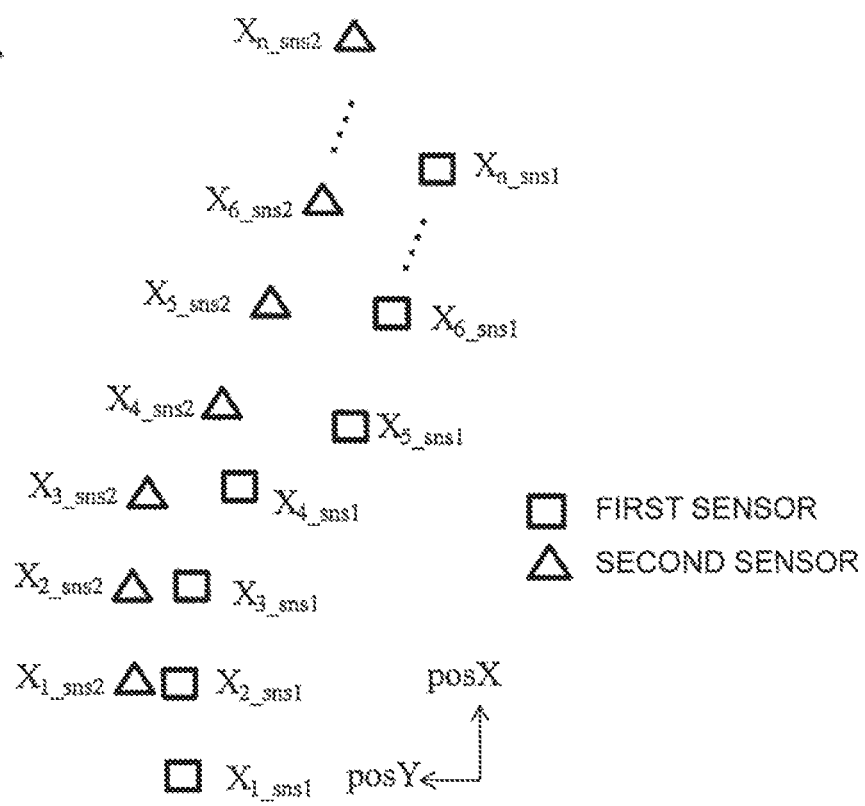
FIG. 8A is an explanatory diagram of the error correction processing in the third embodiment of the present invention.
Figure 8B:
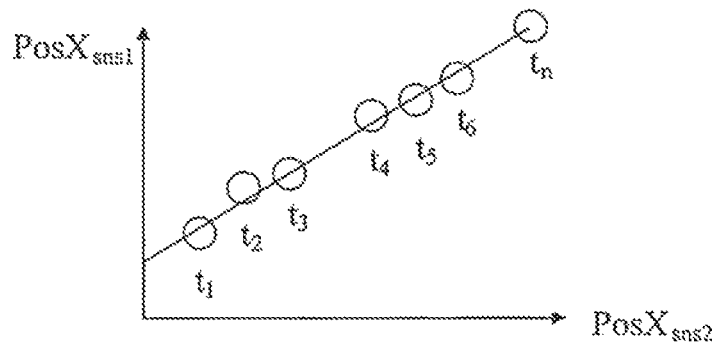
FIG. 8B is a graph for showing a correlation coefficient of vertical positions in the third embodiment of the present invention.
Figure 8C:
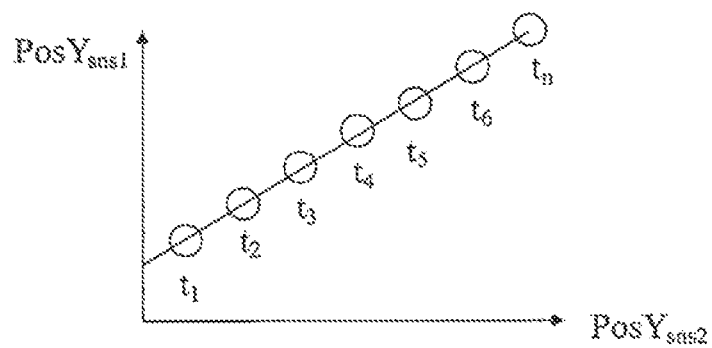
FIG. 8C is a graph for showing a correlation coefficient of horizontal positions in the third embodiment of the present invention.

FIG. 7 is a flow chart for illustrating a flow of processing to be executed by the obstacle recognition device 1 according to the third embodiment of the present invention. Further, FIG. 8A is an explanatory diagram of the error correction processing to be executed by the obstacle recognition device 1 according to the third embodiment of the present invention, FIG. 8B is a graph for showing a correlation coefficient of vertical positions, and FIG. 8C is a graph for showing a correlation coefficient of horizontal positions. The same components as those of the first embodiment or the second embodiment are denoted by the same reference symbols, and a description thereof may be omitted.

The processing of deleting the oldest observation data in Step S10 of FIG. 7 and the processing of adding the latest observation data in Step S11 of FIG. 7 are similar to those of FIG. 3 described in the first embodiment, and thus a description thereof is omitted here.

Next, similarly to the second embodiment, in Step S30, the control unit 10 uses the own vehicle data to execute conversion of the observation data of the first sensor 100 and the second sensor 200 into a ground coordinate system.

Next, similarly to the second embodiment, in Step S32, the control unit 10 selects one object for each of the first sensor 100 and the second sensor 200 from among a plurality of objects acquired by each of the first sensor 100 and the second sensor 200, based on the coordinate-converted data stored in the storage unit 10d. A pair of pieces of coordinate-converted data on the selected objects is selected.

Next, in Step S40, the calculation unit 10a of the control unit 10 uses the coordinate-converted data to calculate a correlation coefficient of the selected pair of objects.

FIG. 8A to FIG. 8C are diagrams for illustrating a method of calculating a correlation coefficient r of the selected pair of objects in the third embodiment of the present invention.

In FIG. 8A, a vertical position posX and a horizontal position posY of an object at the times t1 to tn are set in the ground coordinate system xy. Further, each plot of FIG. 8A indicates pieces of coordinate-converted data $X1\_sns1$ to $Xn\_sns1$ on the object detected by the first sensor 100 and pieces of coordinate-converted data $X1\_sns2$ to $Xn\_sns2$ on the object detected by the second sensor 200 at the times t1 to tn.

That is, $X1\_sns1$ to $Xn\_sns1$ illustrated in FIG. 8A indicate vertical positions (PosXsns1) at the times t1 to tn of the object detected by the first sensor 100. Similarly, $X1\_sns2$ to $Xn\_sns2$ indicate vertical positions (PosXsns2) at the times t1 to tn of the object detected by the second sensor 200.

Further, $Y1\_sns1$ (not shown) to $Yn\_sns1$ (not shown) indicate horizontal positions (PosYsns1) at the times t1 to tn of the object detected by the first sensor 100. Similarly, $Y1\_sns2$ (not shown) to $Yn\_sns2$ (not shown) indicate vertical positions (PosYsns2) at the times t1 to tn of the object detected by the second sensor 200.

In Step S40, the calculation unit 10a of the control unit 10 calculates, for the selected pair of objects, the vertical positions PosXsns1 and PosXsns2 and the horizontal positions PosYsns1 and PosYsns2 at the times t1 to tn.

Next, the calculation unit 10a calculates a correlation coefficient rposX of the vertical positions (PosXsns1, PosXsns2) and a correlation coefficient rposY of the horizontal positions (PosYsns1, PosYsns2).

FIG. 8B is a graph for showing an example of a method of calculating the correlation coefficient rposX of the vertical positions (PosXsns1, PosXsns2). The horizontal axis of FIG. 8B indicates the vertical position (PosXsns2) of the object detected by the second sensor 200, and the vertical axis of FIG. 8B indicates the vertical position (PosXsns1) of the object detected by the first sensor 100.

As shown in FIG. 8B, the correlation coefficient rposX is calculated with the use of a combination of data sequences {(PosXsns_1ti, PosXsns2_ti)} of PosXsns1_ti and PosXsns2_ti (i=1, 2, *n) indicating the vertical positions at the times t1 to tn as variables.

FIG. 8C is a graph for showing an example of a method of calculating the correlation coefficient rposY of the horizontal positions (PosXsns1, PosXsns2). The horizontal axis of FIG. 8C indicates the horizontal position (PosYsns2) of the object detected by the second sensor 100, and the vertical axis of FIG. 8C indicates the horizontal position (PosYsns1) of the object detected by the first sensor 100.

As shown in FIG. 8C, the calculation unit 10a calculates the correlation coefficient rposY with the use of a combination of data sequences {(PosYsns1_ti, PosYsns2_ti)} of PosYsns1_ti and PosYsns2_ti (i=1, 2, *n) indicating the horizontal positions at the times t1 to tn as variables.

Next, in Step S41, the determination unit 10b of the control unit 10 determines whether the selected pair of objects is the same object based on a condition (3) set in advance. As the correlation coefficient calculated in the above-mentioned manner becomes larger, the selected pair of objects is more highly likely to be the same object. Thus, determination based on the condition (3) can be executed in the following manner, for example.

First, the control unit 10 sets in advance threshold values corresponding to the correlation coefficients rposX and rposY. In Step S41, when both of the correlation coefficients rposX and rposY are equal to or larger than the respective threshold values set in advance (Step S41: Yes), the determination unit 10b of the control unit 10 determines that the selected pair of objects is the same object. Then, the control unit 10 advances the processing to Step S15.

On the contrary, in Step S41, when any one of the correlation coefficients rposX and rposY is smaller than the corresponding threshold value set in advance (Step S41: No), the determination unit 10b of the control unit 10 determines that the selected pair of objects is not the same object. Then, the control unit 10 advances the processing to Step S21.

The processing of Step S15 and Step S21 following Step S41 and the subsequent steps are similar to that of FIG. 3 described in the first embodiment, and thus a description thereof is omitted here.

As described above, according to the obstacle recognition device of the third embodiment, it is possible to accurately recognize an object by determining whether the selected pair of objects is the same object with the use of the correlation coefficient calculated by using time-series data on the ground coordinate positions of the selected pair of objects as a determination index value.

Fourth Embodiment

Next, with reference to FIG. 9 to FIG. 12, a description is given of an obstacle recognition device 2 according to a fourth embodiment of the present invention.

In the bias error correction processing in the first to third embodiments, a description has been given of an example of determining whether the selected pair of objects is the same object based on the observation data of the first sensor 100 and the second sensor 200.

Meanwhile, the obstacle recognition device 2 according to the fourth embodiment of the present invention includes a prediction processing unit in addition to the components of the obstacle recognition device 1 according to each of the first to third embodiments. In the fourth embodiment, a description is given of an example of determining whether the selected pair of objects is the same object based on the observation data of the first sensor 100 or the second sensor 200 and on the predication data calculated by the prediction processing unit. In the following description, the same components as those of the first to third embodiments are denoted by the same reference symbols, and a description thereof may be omitted.

Further, in the following description, a description is given of a case in which the observation data of the first sensor 100 and the prediction data are used. However, the observation data of the second sensor 200 can also be used instead of the observation data of the first sensor 100.

Figure 9:
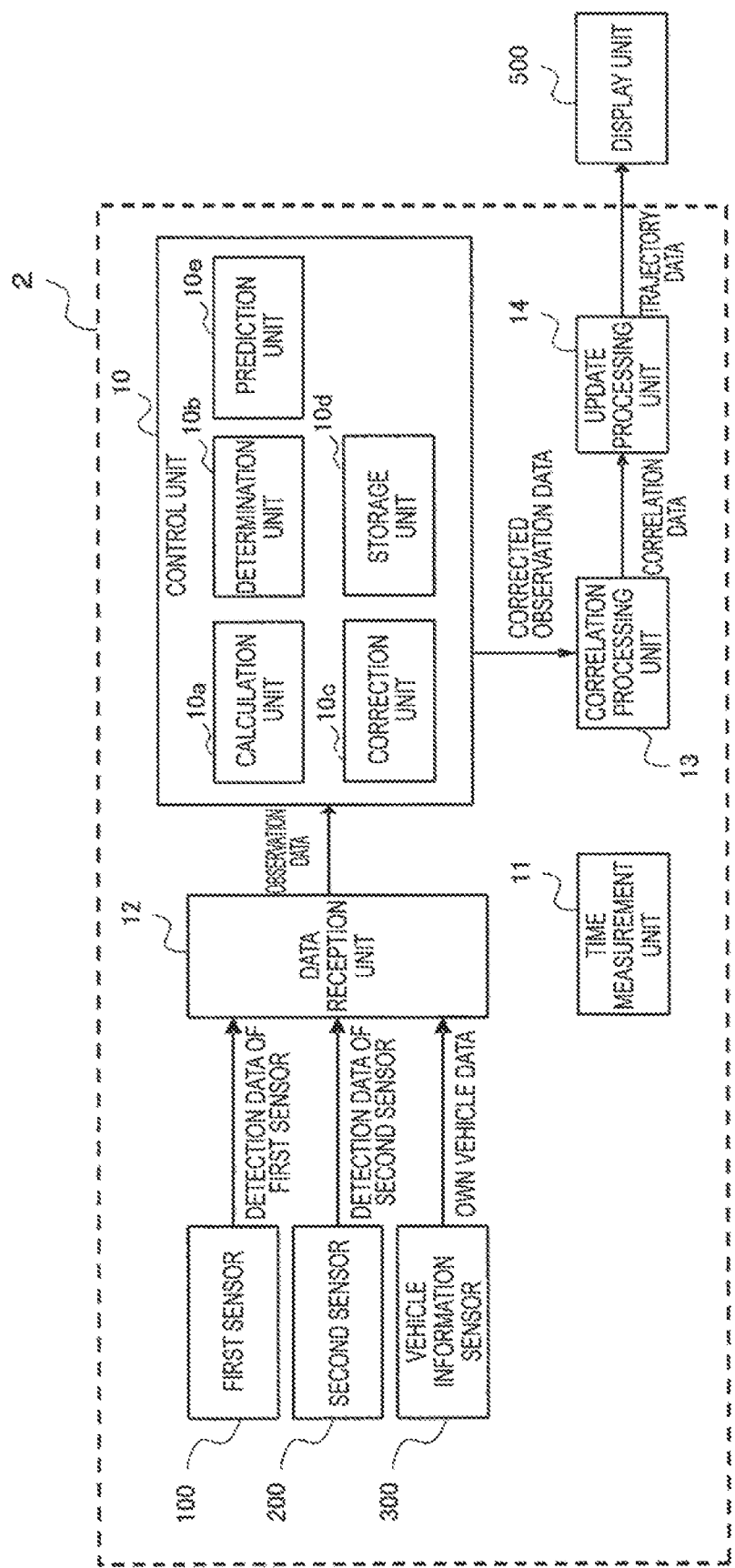
FIG. 9 is a block diagram for illustrating a configuration of an obstacle recognition device according to each of fourth, fifth, and sixth embodiments of the present invention.

FIG. 9 is a block diagram for illustrating a configuration of the obstacle recognition device 2 according to the fourth embodiment of the present invention. The obstacle recognition device 2 according to the fourth embodiment includes a prediction unit 10e in addition to the components of the obstacle recognition device 1 according to each of the first to third embodiments illustrated in FIG. 1.

Figure 10:
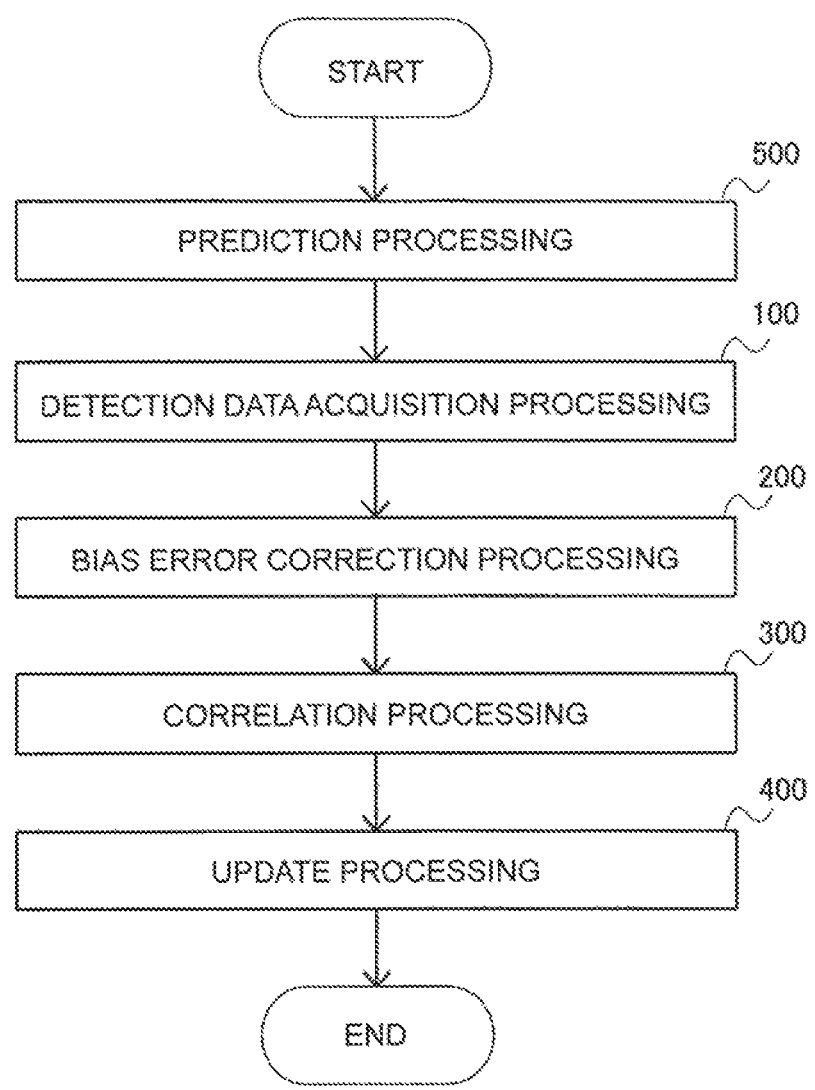
FIG. 10 is a flow chart for illustrating processing to be executed by the obstacle recognition device according to each of the fourth, fifth, and sixth embodiments of the present invention.

Next, with reference to a flow chart of FIG. 10, a description is given of a flow of processing to be executed by the obstacle recognition device 2 according to the fourth embodiment.

In the flow chart of the fourth embodiment illustrated in FIG. 10, prediction processing (Step S500) is executed first unlike in the flow chart of the first embodiment illustrated in FIG. 2.

Specifically, the prediction unit 10e executes the prediction processing (Step S500) of calculating prediction data in a state of the trajectory of the object at the current time based on trajectory data being object information updated in update processing (Step S400) in a previous period. The "state of the trajectory of the object" herein refers to, for example, the position, speed, acceleration, or attribute information of the detected object.

The calculated prediction data is transmitted from the prediction unit 10e to the storage unit 10d. The storage unit 10d creates and stores a prediction data history storing prediction data in a chronological order.

Next, the data reception unit 12 executes the detection data acquisition processing (Step S100). The detection data acquisition processing is similar to Step S100 in the first to third embodiments. As described below, when observation data of the first sensor 100 is used for the bias error correction processing, observation data of the second sensor 200 is not required to be acquired.

Next, the control unit 10 executes the bias error correction processing (Step S200). In the bias error correction processing, first, the calculation unit 10a of the control unit 10 calculates, based on observation data output from the data reception unit 12 and prediction data output from the prediction unit 10e, a value of a difference in physical quantity between the object detected by the first sensor 100 and an object in prediction data.

Next, the determination unit 10b of the control unit 10 determines whether the pair of objects, which is selected from the observation data of the first sensor 100 and the prediction data, is the same object based on a preset condition. When it is determined that the pair of objects is the same object, the control unit 10 sets or calculates an error (hereinafter referred to as "bias error" similarly to first to third embodiments) between the observation data of the first sensor 100 and the prediction data of the selected pair of objects.

Next, the correction unit 10c of the control unit 10 uses the bias error value to correct observation data, and finishes the bias error correction processing. The corrected observation data is output from the control unit 10 to the correlation processing unit 13.

Next, the correlation processing unit 13 executes the correlation processing (Step S300). In the correlation processing, the correlation processing unit 13 uses the corrected observation data to associate the corrected observation data of the first sensor 100 with the prediction data, to thereby generate correlation data. The correlation processing unit 13 outputs the corrected observation data and the correlation data to the update processing unit 14.

Next, the update processing unit 14 executes the processing of updating the object information (Step S400). The update processing unit 14 uses the correlation data to update the corrected observation data of the first sensor 100 and the object information of the prediction data by executing sensor fusion, for example.

After that, the obstacle recognition device 2 finishes the processing. The processing illustrated in FIG. 10 is repeatedly executed at a preset operation period.

Next, details of the bias error correction processing to be executed by the obstacle recognition device 2 according to the fourth embodiment are described with reference to FIG. 11 and FIG. 12.

Figure 11:
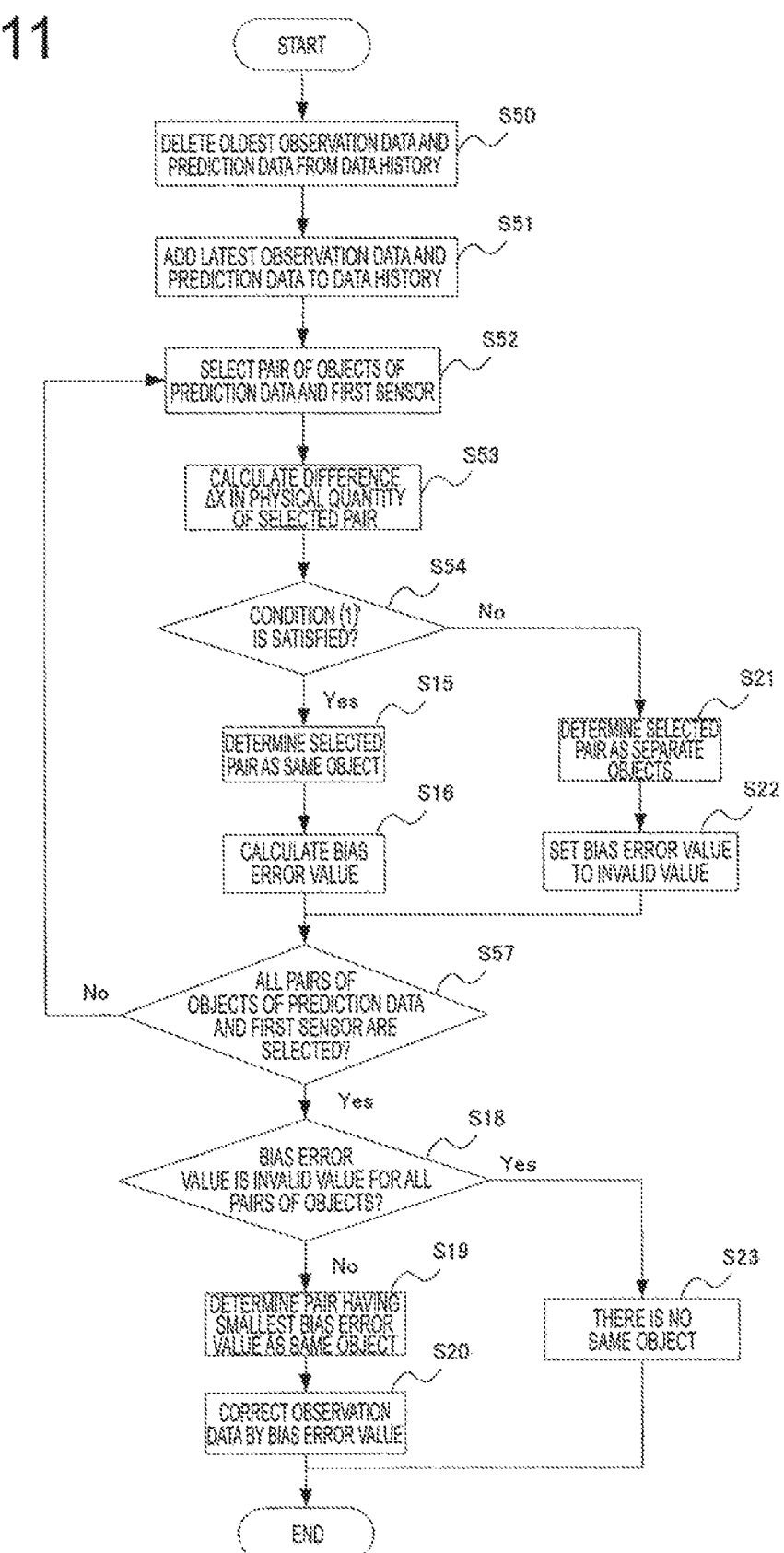
FIG. 11 is a flow chart for illustrating error correction processing in the fourth embodiment of the present invention.

FIG. 11 is a flowchart for illustrating the bias error correction processing to be executed by the obstacle recognition device 2 according to the fourth embodiment of the present invention.

The bias error correction processing in the fourth embodiment is similar to processing to be executed when the observation data of the second sensor 200 is replaced with the prediction data in the first embodiment. Thus, in the following description, the same components as those of the first embodiment are denoted by the reference symbols, and a description thereof may be omitted.

In Step S50 of FIG. 11, the control unit 10 of the obstacle recognition device 2 deletes the oldest observation data among pieces of observation data stored in the storage unit 10$d$. Further, the control unit 10 deletes the oldest prediction data among pieces of prediction data stored in the storage unit 10$d$.

Next, in Step S51, the control unit 10 stores the latest observation data acquired in the current period into the observation data history of the storage unit 10$d$. Further, the control unit 10 stores the prediction data at the current period into the observation data history of the storage unit 10$d$.

Next, in Step S52, the control unit 10 selects one object from among a plurality of objects contained in the observation data of the first sensor 100 stored in the storage unit 10$d$ and one object from among a plurality of objects contained in the prediction data stored in the storage unit 10$d$, to thereby set a selected pair of objects.

Next, in Step S53, the calculation unit 10$a$ of the control unit 10 calculates, as the error value $\Delta X$, a value of a difference in physical quantity between the observation data of the first sensor 100 and the prediction data in the selected pair of objects. The processing of Step S53 is processing in which the observation data of the second sensor 200 in Step S13 of the first embodiment is replaced with the prediction data. The method of calculating $\Delta X$ is described with reference to FIG. 11.

Figure 12:
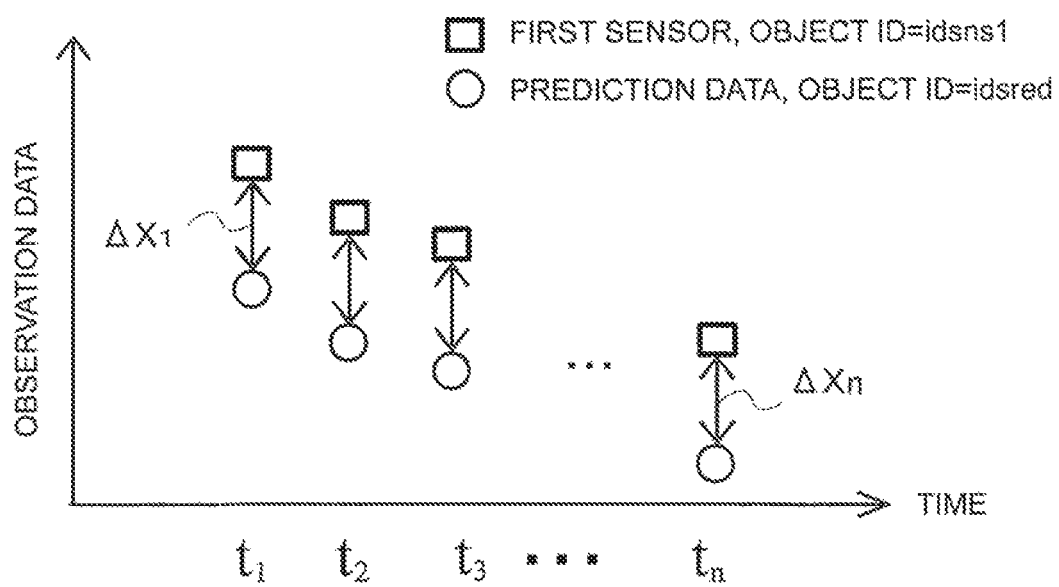
FIG. 12 is a graph for showing an error calculation method in the fourth embodiment of the present invention.

FIG. 12 is a graph for showing the method of calculating the error $\Delta X$ between the observation data and the prediction data in the fourth embodiment of the present invention.

The object detected by the first sensor 100 is set to have an object ID=idsns1 in the selected pair of objects. The observation data at a time k of the object ID=idsns1 is set to be Xksns1. Similarly, the object contained in the prediction data is set to have an object ID=idsred in the selected pair. Observation data of the object ID=idsred at the time k is set to be Xksred.

An error $\Delta Xk$ between the observation data at the time k and the predication data can be set to be an absolute value of a difference between Xksns1 and Xksred. In Step S53 of FIG. 11, as shown in FIG. 12, the calculation unit 10$a$ of the control unit 10 calculates the errors $\Delta X1$ to $\Delta Xn$ corresponding to the times t1 to tn, respectively.

Returning to FIG. 11, the control unit 10 advances the processing to Step S54. In Step S54, the determination unit 10$b$ of the control unit 10 determines whether the selected pair of objects set in Step S52 is the same object based on a condition (1)' set in advance.

The determination based on the condition (1)' can be executed in the following manner, for example.

In Step S54, when the range of deviations of the errors $\Delta X1$ to $\Delta Xn$ is smaller than a threshold value set in advance (Step S54: Yes), the determination unit 10$b$ of the control unit 10 determines that the selected pair of objects is the same object (Step S15).

On the contrary, in Step S54, when the range of deviations of the inter-sensor errors $\Delta X1$ to $\Delta Xn$ is equal to or larger than the threshold value set in advance (Step S54: No), the determination unit 10$b$ of the control unit 10 determines that the selected pair of objects is not the same object (Step S21). A value obtained by subtracting the minimum value from the maximum value of $\Delta X1$ to $\Delta Xn$, an average value of $\Delta X1$ to $\Delta Xn$, a median of $\Delta X1$ to $\Delta Xn$, or other values can be used as the range of deviations.

After Step S15, the control unit 10 advances the processing to Step S16.

In Step S16, the control unit 10 sets a bias error value of the selected pair of objects. The latest $\Delta Xn$ can be used as the bias error value from among the inter-sensor errors $\Delta X1$ to $\Delta Xn$ of pieces of observation data corresponding to the times t1 to tn, for example. Alternatively, the average value, median, or other values of $\Delta X1$ to $\Delta Xn$ may be used as the bias error value.

Meanwhile, after Step S21, the control unit 10 advances the processing to Step S22.

In Step S22, the control unit 10 sets the bias error value of the selected pair of objects to an invalid value.

After Step S16 or Step S22, the control unit 10 advances the processing to Step S57.

In Step S57, when all the pairs of objects are already selected for objects contained in the observation data of the first sensor 100 and the prediction data (Step S57: Yes), the control unit 10 advances the processing to Step S18.

On the contrary, when not all the pairs of objects are selected (Step S57: No), the control unit 10 returns to Step S52 to newly set a selected pair of objects.

In Step S18, the determination unit 10$b$ of the control unit 10 determines whether the bias error value set in Step S16 is an invalid value for all the selected pairs of objects. When the bias error value is not set to an invalid value for all the selected pairs of objects (Step S18: No), the control unit 10 advances the processing to Step S19. On the contrary, when the bias error value is not set to an invalid value for any of the selected pairs of objects (Step 518: Yes), the control unit 10 advances the processing to Step S23.

In Step S18, the control unit 10 determines, as the same object, a selected pair of objects having the smallest bias error value among all the selected pairs of objects. Next, the control unit 10 advances the processing to Step S20.

In Step S23, the control unit 10 determines that there is no same object among all the selected pairs of objects, and finishes the bias error correction processing.

In Step S20, the correction unit 10c of the control unit 10 uses the bias error value for the selected pair of objects determined to be the same object to execute processing of correcting the observation data of the first sensor 100. The correction processing may be, in order to remove a bias error, to subtract the bias error value from observation data of the first sensor 100, for example. After the correction processing of Step S20 is finished, the control unit 10 finishes the bias error correction processing.

In the above-mentioned bias error correction processing, only one of the first sensor 100 and the second sensor 200 may be used for the observation data. Thus, any one of the first sensor 100 and the second sensor 200 can be omitted in the obstacle recognition device 2. Alternatively, only one of the first sensor 100 and the second sensor 200 may be selected preferentially to be used.

As described above, according to the obstacle recognition device of the fourth embodiment, in the bias error correction processing, a physical quantity is calculated from the observation data of the first sensor 100 or the second sensor 200, and the prediction data calculated by the prediction processing unit. Then, it is determined whether the selected pair of objects is the same object with the use of the calculated value of a difference in physical quantity as a determination index value. As a result, it is possible to accurately recognize an object.

Fifth Embodiment

Figure 13:
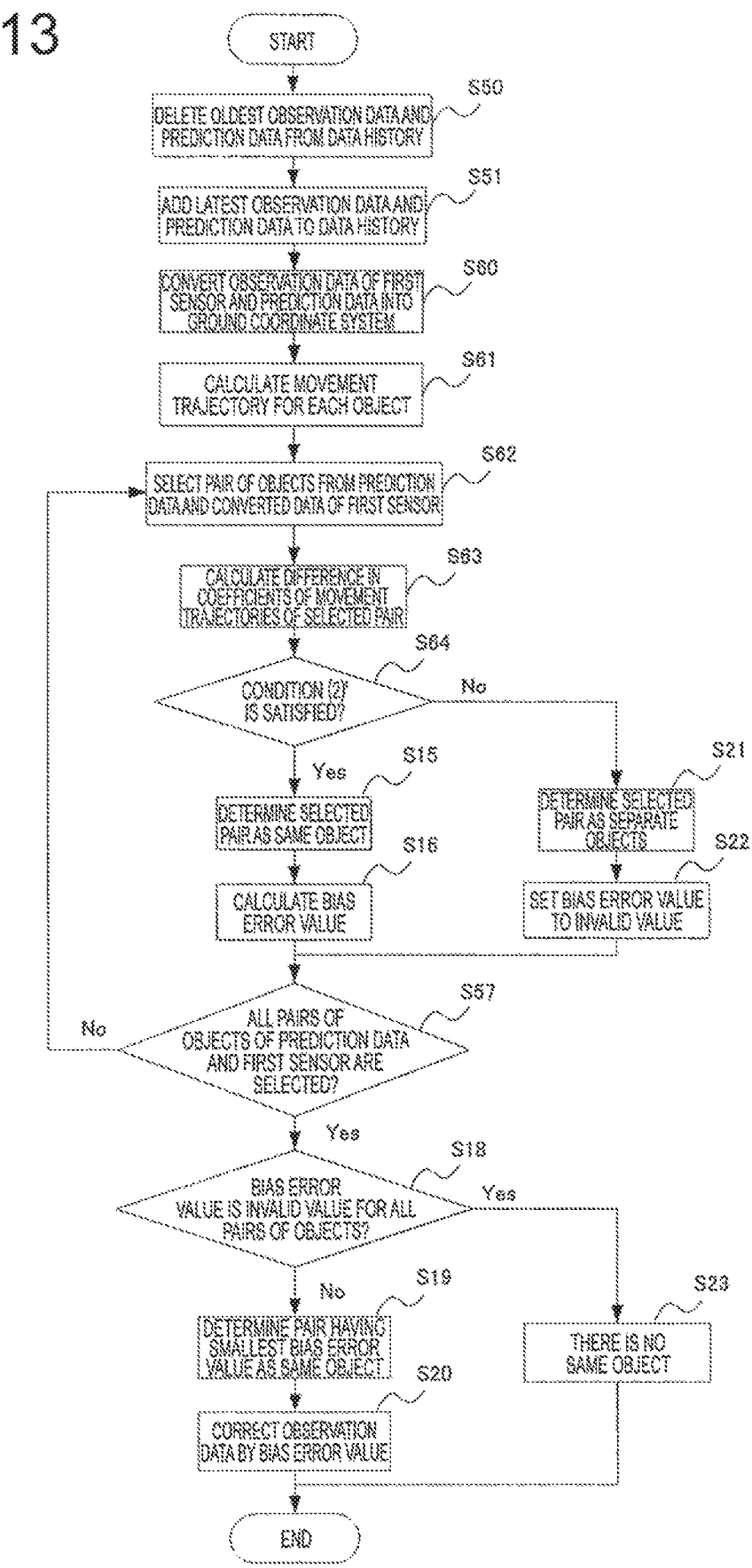
FIG. 13 is a flow chart for illustrating error correction processing in the fifth embodiment of the present invention.
Figure 14:
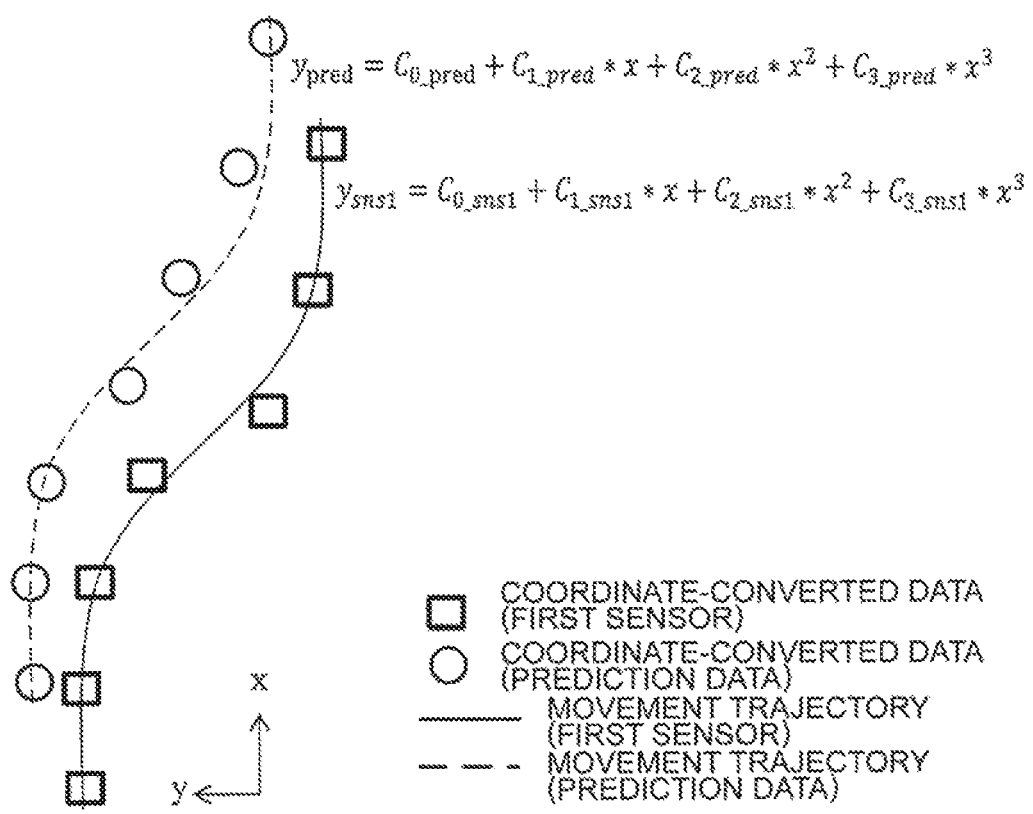
FIG. 14 is an explanatory diagram of the error correction processing in the fifth embodiment of the present invention.

Next, with reference to FIG. 13 and FIG. 14, a description is given of the obstacle recognition device 2 according to a fifth embodiment of the present invention.

The fifth embodiment and the fourth embodiment are different from each other in the configuration of an index value for determining whether the selected pair of objects is the same object. The configuration of the obstacle recognition device 2 according to the fifth embodiment is similar to that of the block diagram illustrated in FIG. 9 of the fourth embodiment, and thus a description thereof is omitted here.

In the bias error correction processing in the fourth embodiment, the value of a difference in physical quantity between the selected pair of objects is calculated based on the observation data of the first sensor 100 or the second sensor 200, and on the prediction data calculated by the prediction processing unit. Further, a description has been given of an example of determining whether the selected pair of objects is the same object by using the calculated value of a difference in physical quantity.

In contrast, in the fifth embodiment, a description is given of an example of, in the configuration of using prediction data similarly to the fourth embodiment, approximating the movement trajectories of the selected pair of objects by polynomials, calculating values of a difference in coefficients of the approximated polynomials, and determining whether the selected pair of objects is the same object.

That is, the bias error correction processing in the fifth embodiment is similar to processing to be executed when any one of the observation data of the first sensor 100 and the observation data of the second sensor 200 in the second embodiment is replaced with the prediction data. Thus, in the following description, the same components as those of the first to fourth embodiments are denoted by the same reference symbols, and a description thereof may be omitted.

In the following description, a description is given of a case in which the observation data of the first sensor 100 and the prediction data are used. However, the observation data of the second sensor 200 can also be used instead of the observation data of the first sensor 100.

Next, details of the bias error correction processing to be executed by the obstacle recognition device 2 according to the fifth embodiment are described with reference to FIG. 13 and FIG. 14.

FIG. 13 is a flowchart for illustrating the bias error correction processing to be executed by the obstacle recognition device 2 according to the fifth embodiment of the present invention.

In Step S50 of FIG. 13, the control unit 10 of the obstacle recognition device 2 deletes the oldest observation data from among pieces of observation data history stored in the storage unit 10d. Further, the control unit 10 deletes the oldest prediction data among pieces of prediction data stored in the storage unit 10d.

Next, in Step S51, the control unit 10 stores the latest observation data acquired in the current period into the observation data history of the storage unit 10d. Further, the control unit 10 stores the prediction data at the current period into the observation data history of the storage unit 10d.

Next, in Step S60, the control unit 10 executes processing of converting the observation data of the first sensor 100 and the prediction data into the ground coordinate system by using the own vehicle data. The coordinate-converted data is stored into the storage unit 10d.

Next, in Step S61, the calculation unit 10a of the control unit 10 uses the coordinate-converted data to calculate the movement trajectories of objects contained in the observation data of the first sensor 100 and the prediction data. The polynomial approximating the movement trajectory is similar to that of the second embodiment.

FIG. 14 is a diagram for illustrating a method of calculating the movement trajectory of the detected object in the fifth embodiment of the present invention. In FIG. 14, the coordinate-converted data on the object detected by the second sensor 200 in FIG. 6 of the second embodiment is replaced with the coordinate-converted data on the object contained in the prediction data.

The calculation unit 10a calculates coefficients of C0$sns$1, C1$sns$1, C2$sns$1, and C3$sns$1 of the polynomial of $ysns1 = C0sns1 + C1sns1*X + C2sns1*X^2 + C3sns1*X^3$ of the movement trajectory of the object detected by the first sensor 100. Similarly, the calculation unit 10a calculates coefficients C0$pred$, C1$pred$, C2$pred$, and C3$pred$ of a polynomial $ypred = C0pred + C1pred*X + C2pred*X^2 + C3pred*X^3$ of the movement trajectory of the object contained in the prediction data.

Next, in Step S62, the control unit 10 selects one object from among a plurality of objects contained in the observation data of the first sensor 100 stored in the storage unit 10d and one object from among a plurality of objects contained in the prediction data stored in the storage unit 10d, to thereby set a selected pair of objects.

Next, in Step S63, the calculation unit 10a of the control unit 10 calculates the absolute values ΔC0, ΔC1, ΔC2, and ΔC3 of a difference in coefficients of the polynomials approximating the movement trajectories of the selected pair of objects. In the case of two movement trajectories illustrated in FIG. 14, $ΔC0 = abs(C0sns1 − C0pred)$, $ΔC1 = abs(C1sns1 − C1pred)$, $ΔC2 = abs(C2sns1 − C2pred)$, and $ΔC3 = abs(C3sns1 − C3pred)$ are calculated.

Next, in Step S64, the determination unit 10b of the control unit 10 determines whether the selected pair of objects is the same object based on a condition (2)' set in advance. The determination based on the condition (2)' can be executed in the following manner, for example.

First, the control unit 10 sets in advance threshold values corresponding to the absolute values $\Delta C0$, $\Delta C1$, $\Delta C2$, and $\Delta C3$ of the values of a difference in coefficients. Then, in Step S64, when all of $\Delta C0$, $\Delta C1$, $\Delta C2$, and $\Delta C3$ are smaller than the respective threshold values set in advance (Step S64: Yes), the determination unit 10b of the control unit 10 determines that the selected pair of objects is the same object (advances the processing to Step S15).

On the contrary, in Step S64, when any one of $\Delta C0$, $\Delta C1$, $\Delta C2$, and $\Delta C3$ is equal to or larger than the corresponding threshold value set in advance (Step S64: No), the determination unit 10b of the control unit 10 determines that the selected pair of objects is not the same object (Step S21).

The processing of Step S15 and Step S21 following Step S64 and the subsequent steps are similar to that of FIG. 11 described in the fourth embodiment, and thus a description thereof is omitted here.

As described above, according to the obstacle recognition device of the fifth embodiment, the movement trajectories of the selected pair of objects in the ground coordinate system are calculated from the observation data of the first sensor 100 or the second sensor 200, and from the prediction data calculated by the prediction processing unit. Then, it is determined whether the selected pair of objects is the same object with the use of the calculated degree of similarity between the movement trajectories of the selected pair of objects as a determination index value. As a result, it is possible to accurately recognize an object.

Sixth Embodiment

Next, with reference to FIG. 15 and FIG. 16A to FIG. 16C, a description is given of the obstacle recognition device 2 according to a sixth embodiment of the present invention.

The sixth embodiment, and the fourth and fifth embodiments are different from each other in the configuration of an index value for determining whether the selected pair of objects is the same object. The configuration of the obstacle recognition device 2 according to the sixth embodiment is similar to that of the block diagram illustrated in FIG. 9 of the fourth embodiment, and thus a description thereof is omitted here.

In the bias error correction processing in the fourth embodiment, the value of a difference in physical quantity between the selected pair of objects is calculated based on the observation data of the first sensor 100 or the second sensor 200, and on the prediction data calculated by the prediction processing unit. Further, a description has been given of an example of determining whether the selected pair of objects is the same object by using the calculated value of a difference in physical quantity. Further, in the fifth embodiment, a description has been given of an example of, in the configuration of using prediction data similarly to the fourth embodiment, approximating the respective movement trajectories of the selected pair of objects by polynomials, calculating values of a difference in coefficients of the approximated polynomials, and determining whether the selected pair of objects is the same object.

In contrast, in the sixth embodiment, in the configuration of using predication data similarly to the fourth embodiment, a correlation coefficient is calculated based on time-series data on the ground coordinate positions of a selected pair of objects, and it is determined whether the selected pair of objects is the same object based on the calculated correlation coefficient.

That is, the bias error correction processing in the sixth embodiment is similar to processing to be executed when any one of the observation data of the first sensor 100 and the observation data of the second sensor 200 in the third embodiment is replaced with the prediction data. Thus, in the following description, the same components as those of the first to fifth embodiments are denoted by the same reference symbols, and a description thereof may be omitted.

In the following description, a description is given of a case in which the observation data of the first sensor 100 and the prediction data are used. However, the observation data of the second sensor 200 can also be used instead of the observation data of the first sensor 100.

Next, with reference to FIG. 15 and FIG. 16A to FIG. 16C, a description is given in detail of the bias error correction processing to be executed by the obstacle recognition device 2 according to the sixth embodiment.

Figure 15:
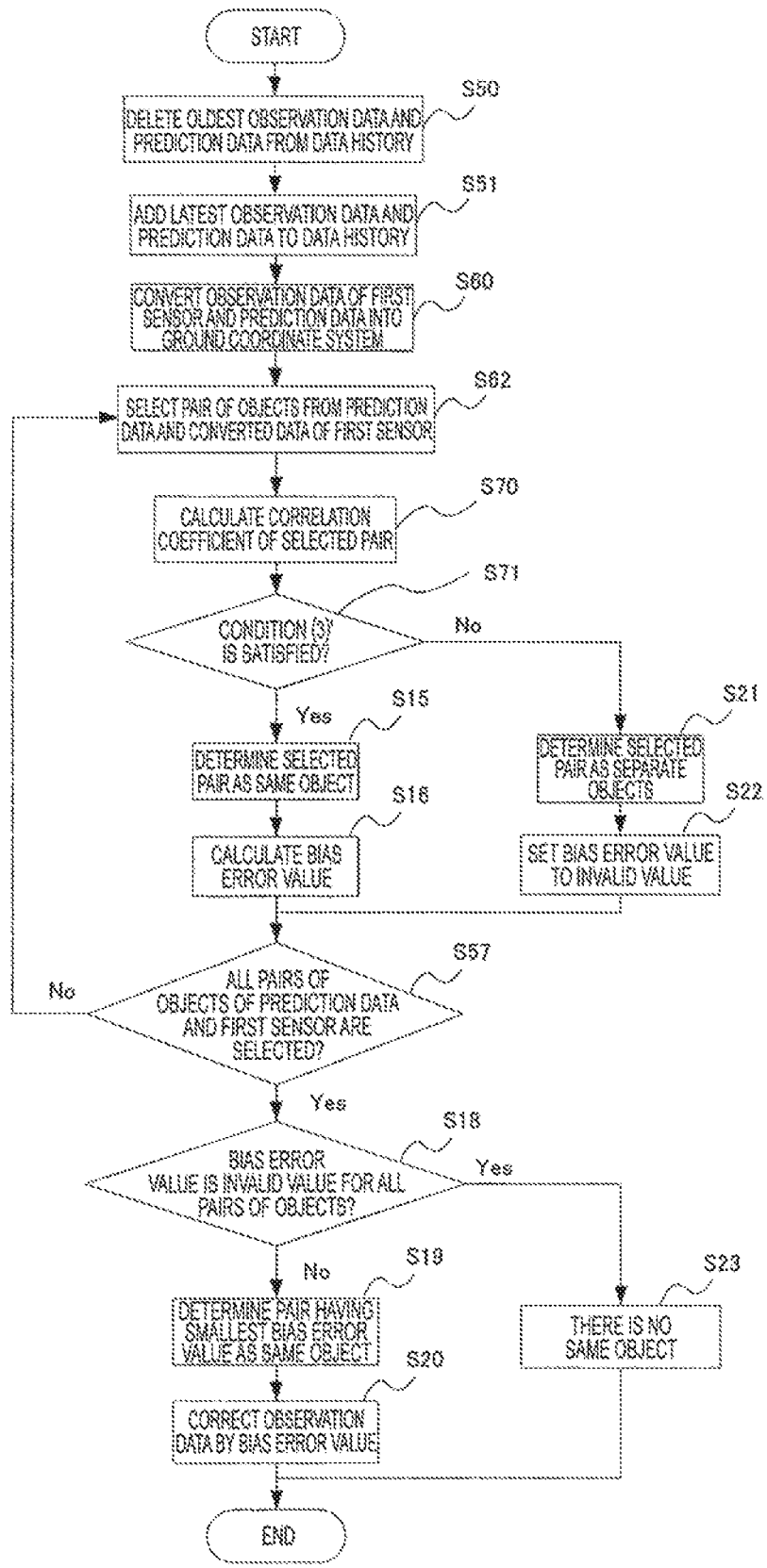
FIG. 15 is a flow chart for illustrating error correction processing in the sixth embodiment of the present invention.
Figure 16A:
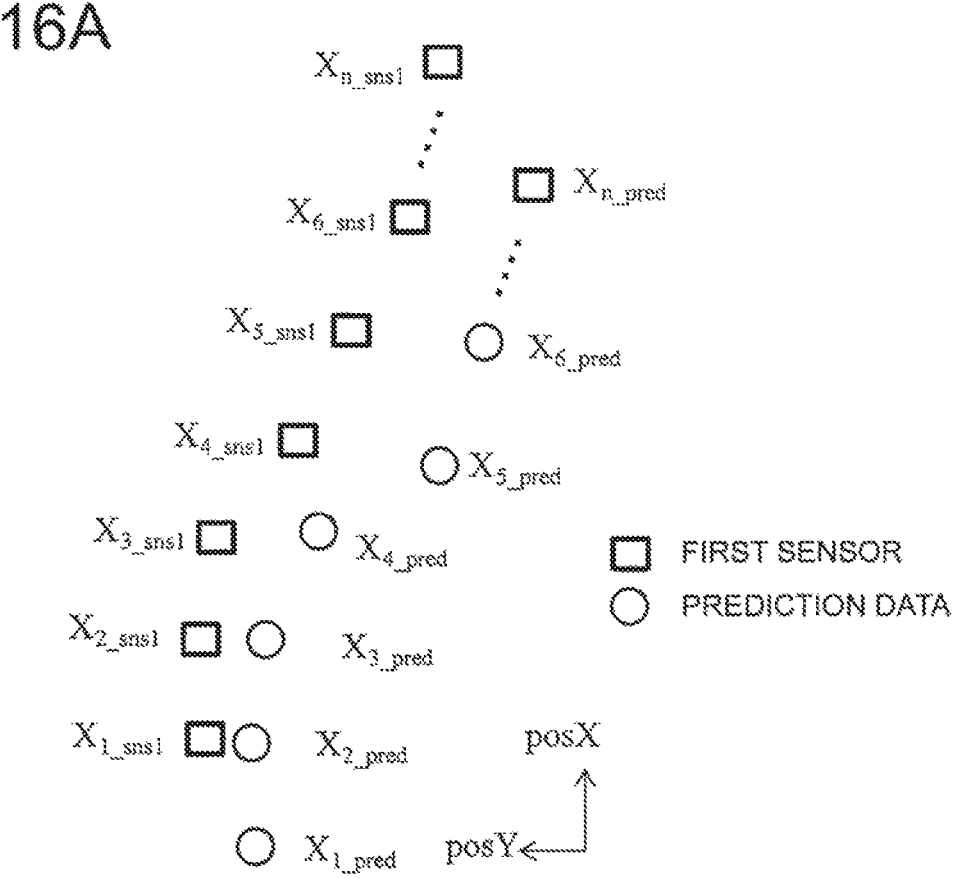
FIG. 16A is an explanatory diagram of error correction processing in the sixth embodiment of the present invention.
Figure 16B:
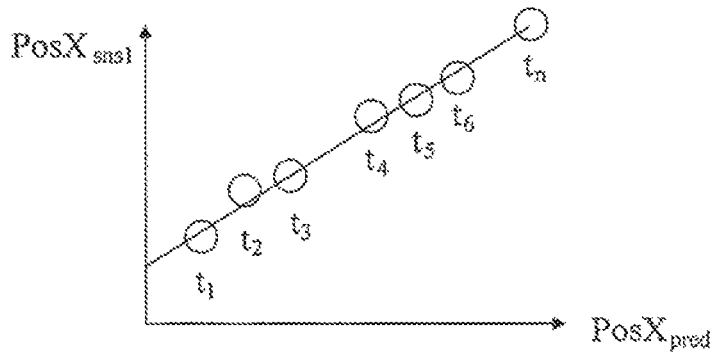
FIG. 16B is a graph for showing a correlation coefficient of the vertical positions in the sixth embodiment of the present invention.
Figure 16C:
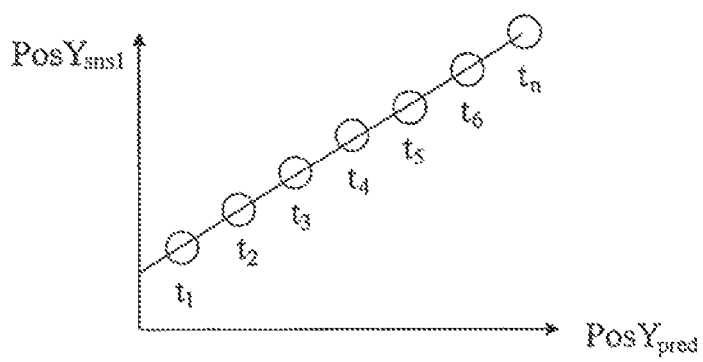
FIG. 16C is a graph for showing a correlation coefficient of the horizontal positions in the sixth embodiment of the present invention.

FIG. 15 is a flow chart for illustrating a flow of processing to be executed by the obstacle recognition device 2 according to the sixth embodiment of the present invention. FIG. 16A is an explanatory diagram of the error correction processing to be executed by the obstacle recognition device 2 according to the sixth embodiment of the present invention, FIG. 16B is a graph for showing a correlation coefficient of vertical positions, and FIG. 16C is a graph for showing a correlation coefficient of horizontal positions.

The processing of deleting the oldest observation data and the oldest prediction data in Step S50 of FIG. 15 and the processing of adding the latest observation data and the latest prediction data in Step S51 are similar to those of FIG. 13 described in the fifth embodiment, and thus a description thereof is omitted here.

Next, similarly to the fifth embodiment, in Step S60, the control unit 10 executes processing of converting the observation data of the first sensor 100 and the prediction data into the ground coordinate system by using the own vehicle data.

Next, similarly to the fourth embodiment, in Step S52, the control unit 10 selects one object from among a plurality of objects contained in the observation data of the first sensor 100 stored in the storage unit 10d and one object from among a plurality of objects contained in the prediction data stored in the storage unit 10d, to thereby set a selected pair of objects.

Next, similarly to the third embodiment, in Step S40, the calculation unit 10a of the control unit 10 uses the coordinate-converted data to calculate a correlation coefficient of the selected pair of objects.

FIG. 16A to FIG. 16C are diagrams for illustrating a method of calculating a correlation coefficient r of the selected pair of objects in the sixth embodiment of the present invention.

That is, $X1\_sns1$ to $Xn\_sns1$ illustrated in FIG. 16A indicate vertical positions (PosXsns1) at the times t1 to tn of the object detected by the first sensor 100. Similarly, $X1\_pred$ to $Xn\_pred$ indicate vertical positions (PosXpred) at the times t1 to tn of the prediction data.

Further, $Y1\_sns1$ (not shown) to $Yn\_sns1$ (not shown) indicate horizontal positions (PosYsns1) at the times t1 to tn of the object detected by the first sensor 100. Similarly, $Y1\_pred$ (not shown) to $Yn\_pred$ (not shown) indicate vertical positions (PosYpred) at the times t1 to tn of the prediction data.

In Step S70, the calculation unit 10a of the control unit 10 calculates, for the selected pair of objects, the vertical positions PosXsns1 and PosXpred and the horizontal positions PosYsns1 and PosYpred at the times t1 to tn.

Next, the calculation unit 10a calculates a correlation coefficient rposX of the vertical positions (PosXsns1, PosXpred) and a correlation coefficient rposY of the horizontal positions (PosYsns1, PosYpred).

FIG. 16B is a graph for showing an example of a method of calculating the correlation coefficient rposX of the vertical positions (PosXsns1, PosXpred).

As shown in FIG. 16B, the calculation unit 10a calculates the correlation coefficient rposX with the use of a combination of data sequences {(PosXsns1_ti, PosXpred_ti)} of PosXsns1_ti and PosXpred_ti (i=1, 2, *n) indicating the vertical positions at the times t1 to tn as variables.

FIG. 16C is a graph for showing an example of a method of calculating the correlation coefficient rposY of the horizontal positions (PosXsns1, PosXpred).

As shown in FIG. 16C, the correlation coefficient rposY is calculated with the use of a combination of data sequences {(PosYsns1_ti, PosYpred_ti)} of PosYsns1_ti and PosYpred_ti (i=1, 2, *n) indicating the horizontal positions at the times t1 to tn as variables.

Next, in Step S71, the determination unit 10b of the control unit 10 determines whether the selected pair of objects is the same object based on a condition (3)' set in advance. The determination based on the condition (3)' can be executed in the following manner, for example.

First, the control unit 10 sets in advance threshold values corresponding to the correlation coefficients rposX and rposY. In Step S41, when both of the correlation coefficients rposX and rposY are equal to or larger than the respective threshold values set in advance (Step S71: Yes), the determination unit 10b of the control unit 10 determines that the selected pair of objects is the same object. Then, the control unit 10 advances the processing to Step S15.

On the contrary, in Step S71, when any one of the correlation coefficients rposX and rposY is smaller than the corresponding threshold value set in advance (Step S71: No), the determination unit 10b of the control unit 10 determines that the selected pair of objects is not the same object. Then, the control unit 10 advances the processing to Step S21.

The processing of Step S15 and Step S21 following Step S71 and the subsequent steps are similar to that of FIG. 9 described in the fourth embodiment, and thus a description thereof is omitted here.

As described above, according to the obstacle recognition device of the sixth embodiment, in the bias error correction processing, the correlation coefficient of positions of a selected pair of objects in the ground coordinate system is calculated from the observation data of the first sensor 100 or the second sensor 200, and from the prediction data calculated by the prediction processing unit. Then, it is determined whether the selected pair of objects is the same object with the use of the calculated correlation coefficient as a determination index value. As a result, it is possible to accurately recognize an object.

Seventh Embodiment

In a seventh embodiment of the present invention, the obstacle recognition device 1 and the obstacle recognition device 2 according to the first to sixth embodiments are configured to correct a detection time of the detection data based on the delay time of a sensor. Processing of correcting the detection time of the detection data based on the delay time of a sensor is hereinafter referred to as "processing of correcting detection time".

A sensor has a delay time corresponding to the type of the sensor, for example. The delay time of a sensor is, for example, a period of time since the detected object entered a detection region of the sensor until the sensor executes output, and is also referred to as "response time" of a sensor. Thus, when the delay time of a sensor is not considered, a temporal deviation may occur in the detection data.

Now, a description is given of the processing of correcting the detection time in the seventh embodiment of the present invention.

First, a description is given of a timing to execute the processing of correcting the detection time.

As described with reference to FIG. 2 (obstacle recognition device 1) of the first embodiment and FIG. 10 (obstacle recognition device 2) of the fourth embodiment, the data reception unit 12 acquires detection data from a sensor in the detection data acquisition processing (Step S100). Next, the data reception unit 12 generates observation data obtained by associating the acquired detection data with the time measured by the time measurement unit 11.

When the sensor does not have a delay time, the time measurement unit 11 measures a time at which the data reception unit 12 has received the detection data from the sensor, and the detection data at the measured time can be applied as it is as the observation data. However, when the sensor has a delay time, a deviation between the time at which the data reception unit 12 has received the detection data from the sensor and the time at which the sensor has actually detected an object may occur.

Specifically, the processing of correcting the detection time is processing of correcting time information contained in the observation data. Thus, the processing of correcting the detection time is desirably executed in a period of time since the data reception unit 12 acquired the detection data until the control unit 10 uses the observation data to execute the bias error correction processing.

The processing of correcting the detection time can be set to be executed when the data reception unit 12 generates the observation data.

Alternatively, the data reception unit 12 may acquire and output the detection data, and the calculation unit 10a of the control unit 10 may execute the processing of correcting the detection time. In that case, the data reception unit 12 may output the detection data to the control unit 10, and then the calculation unit 10a of the control unit 10 may execute the processing of correcting the detection time.

In the following, a description is given of a case in which the calculation unit 10a of the control unit 10 executes the processing of correcting the detection time.

Next, a description is given of details of the processing of correcting the detection time.

In the obstacle recognition device 1, when the delay times of the first sensor 100 and the second sensor 200 are known, the calculation unit 10a of the control unit 10 adds the respective known delay times to pieces of detection data of the first sensor 100 and the second sensor 200, to thereby execute the processing of correcting the detection time.

Figure 17A:
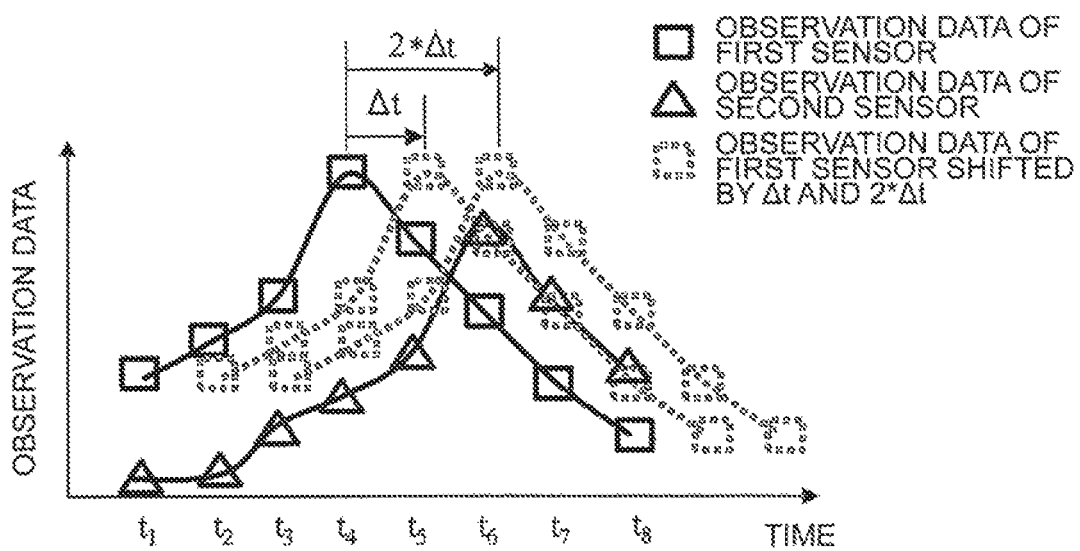
FIG. 17A is a graph for showing detection time correction in the sixth embodiment of the present invention.
Figure 17B:
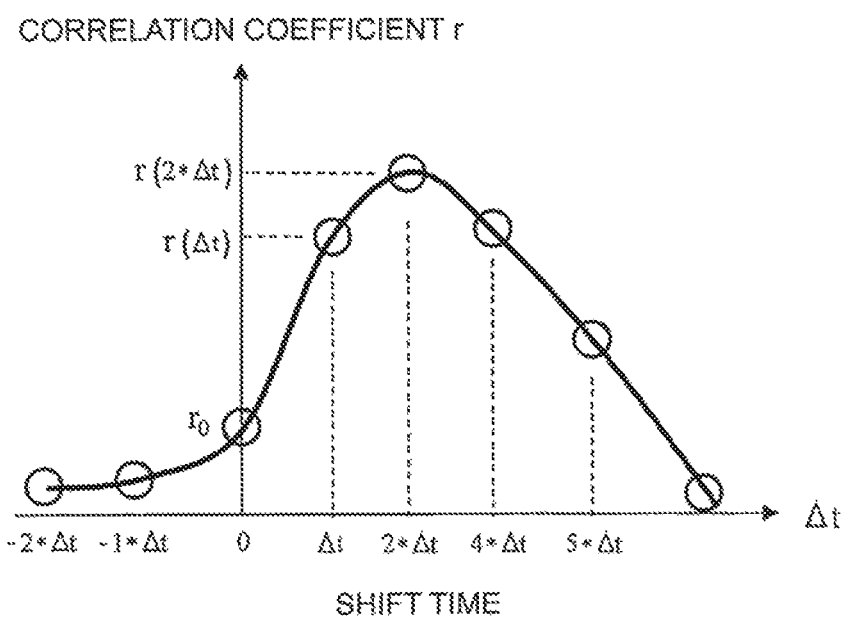
FIG. 17B is a graph for showing an amount of the detection time correction and a correlation coefficient in a seventh embodiment of the present invention.

Next, with reference to FIG. 17A and FIG. 17B, a description is given of a method of correcting the detection time by using the observation data of the first sensor 100 and the second sensor 200 in the obstacle recognition device 1.

FIG. 17A is a graph for showing time-series observation data of the first sensor 100 and the second sensor 200. Further, FIG. 17B represents a relationship between the amount (hereinafter referred to as "shift time") of correction of the detection time and a correlation coefficient r of the time-series data. The control unit 10 estimates the delay time based on the relationship shown in FIG. 17B between the shift time and the correlation coefficient r.

First, the control unit 10 uses time-series observation data of the first sensor 100 and the second sensor 200 to calculate a correlation coefficient r0 of the time-series data.

Next, as shown in FIG. 17A, the control unit 10 shifts the time-series observation data of the first sensor 100 by a shift time $\Delta t$ corresponding to one period in a direction of increase in time. Next, the control unit 10 calculates the correlation coefficient $r(\Delta t)$ of the time-series data based on the time-series observation data of the first sensor 100, which has been shifted by $\Delta t$, and the time-series observation data of the second sensor 200.

Next, as shown in FIG. 17A, the control unit 10 shifts the time-series observation data of the first sensor 100 by a shift time $2*\Delta t$ corresponding to two periods in the direction of increase in time. Next, the control unit 10 calculates the correlation coefficient $r(2*\Delta t)$ of the time-series data based on the time-series observation data of the first sensor 100, which has been shifted by $2*\Delta t$, and the time-series observation data of the second sensor 200.

Similarly, the control unit 10 shifts the time-series observation data of the first sensor 100 by $3*\Delta t$, $4*\Delta t$, $5*\Delta t$, $-1*\Delta t$, and $-2*\Delta t$ to calculate each correlation coefficient.

FIG. 17B is a graph obtained by plotting the correlation coefficient r of the time-series data calculated as described above with the shift time being set as the horizontal axis. In the example of FIG. 17B, the correlation coefficient r of the time-series data is maximum when the shift time is $2*\Delta t$.

The control unit 10 sets the shift time ($2*\Delta t$ in FIG. 17A) by which the correlation coefficient r of the time-series data is maximum, as an estimation value of the delay time. Next, the calculation unit 10a of the control unit 10 uses the set estimation value of the delay time to correct the time-series observation data of the first sensor 100.

After the processing of correcting the detection time is finished, the control unit 10 uses the observation data obtained by correcting the detection time to execute the bias error correction processing described in the first to third embodiments. In the bias error correction processing, the calculation unit 10a uses the observation data obtained by correcting the detection time to calculate an index value.

Calculation of the correlation coefficient r and estimation of the delay time may not be executed by the control unit 10, but may be executed by an estimation unit provided inside the obstacle recognition device.

In the following description, as processing to be added to the processing described in the first to third embodiments (obstacle recognition device 1), a description has been given of a case of executing the processing of correcting the detection time by using the time-series observation data of the first sensor 100 and the second sensor 200. The processing of correcting the detection time described above can also be added to the processing described in the fourth to sixth embodiments (obstacle recognition device 2).

In the obstacle recognition device 2, when the delay time of at least any one of the first sensor 100 and the second sensor 200 is already known, the calculation unit 10a adds the known delay time to the detection data of the first sensor 100 or the second sensor 200, to thereby execute the processing of correcting the detection time.

Further, the obstacle recognition device 2 may be configured such that, when the detection time is corrected by using the observation data of the first sensor 100 or the second sensor 200 and the prediction data, the time-series observation data of the second sensor 200 is replaced with the time-series prediction data in the description given above with reference to FIG. 17A and FIG. 17B. Then, after the processing of correcting the detection time is finished, the control unit 10 uses the observation data obtained by correcting the detection time to execute the bias error correction processing described in the fourth to sixth embodiments. In the bias error correction processing, the calculation unit 10a calculates an index value by using the observation data obtained by correcting the detection time.

As described above, according to the obstacle recognition device of the seventh embodiment, it is possible to execute the bias error correction processing under a state in which deviation of the object detection time due to the delay time of a sensor is prevented.

REFERENCE SIGNS LIST 1, 2 obstacle recognition device, 10 control unit, 11 time measurement unit, 12 data reception unit, 13 correlation processing unit, 14 update processing unit, 100 first sensor, 200 second sensor, 300 vehicle information sensor, 500 display unit

The invention claimed is:
1. An obstacle recognition device, comprising:
a first sensor and a second sensor, which are configured to detect an object near a vehicle;
a calculator configured to calculate, based on first detection data on a first object detected by the first sensor and second detection data on a second object detected by the second sensor, an index value for identifying whether the first object and the second object are the same object;
a determiner configured to determine whether the first object and the second object are the same object by comparing the index value with a threshold value set in advance; and
a corrector configured to calculate, when the determiner has determined that the first object and the second object are the same object, a detection error between the first sensor and the second sensor based on the first detection data and the second detection data, and generate corrected detection data based on the detection error,
wherein the corrector is configured to calculate the detection error based on a difference between a measurement value from the first detection data and a corresponding measurement value from the second detection data.
2. The obstacle recognition device according to claim 1,
wherein the first sensor is configured to detect, as the first detection data, a physical quantity of at least any one of a position, a speed, and an acceleration of the first object,
wherein the second sensor is configured to detect, as the second detection data, a physical quantity of at least any one of a position, a speed, and an acceleration of the second object, which is the same physical quantity as the physical quantity of the first sensor, and
wherein the calculator is configured to calculate, as the index value, a difference between the first detection data and the second detection data.
3. The obstacle recognition device according to claim 1,
wherein the first sensor is configured to detect a position of the first object as the first detection data, wherein the second sensor is configured to detect a position of the second object as the second detection data, and wherein the calculator is configured to calculate, as the index value, a degree of similarity between a movement trajectory of the first object calculated from time-series data of the first detection data and a movement trajectory of the second object calculated from time-series data of the second detection data.

4. The obstacle recognition device according to claim 3, wherein the calculator is configured to:
approximate the movement trajectory of the first object by a first polynomial;
approximate the movement trajectory of the second object by a second polynomial; and
calculate, as the degree of similarity, an absolute value of a difference between coefficients of corresponding terms of the first polynomial and the second polynomial.

5. The obstacle recognition device according to claim 1, wherein the first sensor is configured to detect a position of the first object as the first detection data,
wherein the second sensor is configured to detect a position of the second object as the second detection data, and
wherein the calculator is configured to calculate, as the index value, a correlation coefficient of time-series data of the first detection data and time-series data of the second detection data.

6. The obstacle recognition device according to claim 1, further comprising a memory configured to store a delay time as known data, the delay time being defined to be a time difference between a first period of time and a second period of time in a case where the first period of time is longer than the second period of time, the first period of time being a required period of time since detection of the first object by the first sensor until output of the first detection data by the first sensor, the second period of time being a required period of time since detection of the second object by the second sensor until output of the second detection data by the second sensor,
wherein the calculator is configured to:
execute delay processing by assuming that the first detection data is received at a time obtained by delaying a time of acquisition of the first detection data detected by the first sensor by the delay time; and
calculate the index value based on the first detection data subjected to the delay processing and the second detection data not subjected to the delay processing.

7. The obstacle recognition device according to claim 1, further comprising an estimator configured to estimate a delay time based on time-series data of the first detection data and time-series data of the second detection data when the delay time is not known data, the delay time being defined to be a time difference between a first period of time and a second period of time in a case where the first period of time is longer than the second period of time, the first period of time being a required period of time since detection of the first object by the first sensor until output of the first detection data by the first sensor, the second period of time being a required period of time since detection of the second object by the second sensor until output of the second detection data by the second sensor,
wherein the calculator is configured to:
execute delay processing by assuming that the first detection data is received at a time obtained by delaying a time of acquisition of the first detection data detected by the first sensor by the delay time; and
calculate the index value based on the first detection data subjected to the delay processing and the second detection data not subjected to the delay processing.

8. The obstacle recognition device according to claim 7, wherein the estimator is configured to:
temporally shift time-series data of the first detection data in order;
calculate a correlation coefficient of the time-series data of the first detection data and time-series data of the second detection data; and
estimate an amount of temporal shift having the maximum correlation coefficient as the delay time.

9. An obstacle recognition device, comprising:
a first sensor configured to detect an object near a vehicle;
a predictor configured to predict movement of the object based on detection data detected by the first sensor before, to generate a prediction value at a current time as third detection data on a third object;
a calculator configured to calculate, based on first detection data on a first object detected by the first sensor and the third detection data on the third object detected by the predictor, an index value for identifying whether the first object and the third object are the same object; and
a determiner configured to determine whether the first object and the third object are the same object by comparing the index value with a threshold value set in advance; and
a corrector configured to calculate, when the determiner has determined that the first object and the third object are the same object, a bias error between a result of detection by the first sensor and a result of generation by the predictor based on the first detection data and the third detection data, and generate corrected detection data based on the bias error,
wherein the corrector is configured to calculate the bias error based on a difference between a measurement value from the first detection data and a corresponding measurement value from the third detection data.

10. The obstacle recognition device according to claim 9, wherein the first sensor is configured to detect, as the first detection data, a physical quantity of at least any one of a position, a speed, and an acceleration of the first object,
wherein the predictor is configured to predict, as the third detection data, a physical quantity of at least any one of a position, a speed, and an acceleration of the third object, which is the same physical quantity as the physical quantity of the first sensor, and
wherein the calculator is configured to calculate, as the index value, a difference between the first detection data and the third detection data.

11. The obstacle recognition device according to claim 9, wherein the first sensor is configured to detect a position of the first object as the first detection data,
wherein the predictor is configured to predict a position of the third object as the third detection data, and
wherein the calculator is configured to calculate, as the index value, a degree of similarity between a movement trajectory of the first object calculated from time-series data of the first detection data and a movement trajectory of the third object calculated from time-series data of the third detection data.

12. The obstacle recognition device according to claim 11, wherein the calculator is configured to:

approximate the movement trajectory of the first object by a first polynomial;

approximate the movement trajectory of the third object by a third polynomial; and calculate, as the degree of similarity, an absolute value of a difference between coefficients of corresponding terms of the first polynomial and the third polynomial.

13. The obstacle recognition device according to claim 9, wherein the first sensor is configured to detect a position of the first object as the first detection data, wherein the predictor is configured to predict a position of the third object as the third detection data, and wherein the calculator is configured to calculate, as the index value, a correlation coefficient of time-series data of the first detection data and time-series data of the third detection data.

14. An obstacle recognition method to be executed in the obstacle recognition device of claim 1 by a controller configured to implement functions of the calculator, the determiner, and the corrector, the obstacle recognition method comprising the steps of:

calculating the index value for identifying whether the first object and the second object are the same object based on the first detection data on the first object detected by the first sensor and the second detection data on the second object detected by the second sensor;

determining whether the first object and the second object are the same object by comparing the index value with a threshold value set in advance; and calculating, when it is determined in the determining step that the first object and the second object are the same object, the detection error between the first sensor and the second sensor based on the first detection data and the second detection data, and generating corrected detection data based on the detection error, wherein the corrector is configured to calculate the detection error based on a difference between a measurement value from the first detection data and a corresponding measurement value from the second detection data.

15. An obstacle recognition method to be executed in the obstacle recognition device of claim 9 by a controller configured to implement functions of the predictor, the calculator, the determiner, and the corrector, the obstacle recognition method comprising the steps of:

predicting movement of the object based on detection data detected by the first sensor before, and generating a prediction value at a current time as the third detection data on the third object;

calculating, based on the first detection data on the first object detected by the first sensor and the third detection data on the third object generated in the predicting step, the index value for identifying whether the first object and the third object are the same object;

determining whether the first object and the third object are the same object by comparing the index value with a threshold value set in advance; and calculating, when it is determined in the determining step that the first object and the third object are the same object, the bias error between a result of detection by the first sensor and a result of generation in the predicting step based on the first detection data and the third detection data, and generating corrected detection data so as to remove the bias error.

* * * * *